US009239681B2

(12) United States Patent
Watanabe et al.

(10) Patent No.: US 9,239,681 B2
(45) Date of Patent: Jan. 19, 2016

(54) STORAGE SUBSYSTEM AND METHOD FOR CONTROLLING THE STORAGE SUBSYSTEM

(71) Applicant: HITACHI, LTD., Tokyo (JP)

(72) Inventors: Koji Watanabe, Tokyo (JP); Kenta Shiga, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 14/372,929

(22) PCT Filed: Oct. 17, 2013

(86) PCT No.: PCT/JP2013/078214

§ 371 (c)(1),
(2) Date: Jul. 17, 2014

(87) PCT Pub. No.: WO2015/056332

PCT Pub. Date: Apr. 23, 2015

(65) Prior Publication Data

US 2015/0277765 A1 Oct. 1, 2015

(51) Int. Cl.
*G06F 13/00* (2006.01)
*G06F 3/06* (2006.01)

(52) U.S. Cl.
CPC ................ *G06F 3/061* (2013.01); *G06F 3/067* (2013.01); *G06F 3/0646* (2013.01)

(58) Field of Classification Search
CPC ........ G06F 3/061; G06F 3/0646; G06F 3/067
USPC .......... 711/150, 153, 154, 168; 709/214, 229, 709/232; 710/20, 28, 36; 712/12, 16, 225
See application file for complete search history.

(56) References Cited

U.S. PATENT DOCUMENTS 8,307,171 B2 * 11/2012 Ogawa .................... G06F 3/061 711/114
2003/0212860 A1 11/2003 Jiang et al.
2006/0020755 A1 1/2006 Jiang et al.
2006/0224826 A1 * 10/2006 Arai ........................ G06F 3/061 711/114
2007/0136527 A1 6/2007 Xiaoming et al.
2007/0239944 A1 * 10/2007 Rupanagunta ........ G06F 3/0613 711/147
2010/0138208 A1 6/2010 Hattori et al.
2011/0191547 A1 8/2011 Yoshii et al.
2012/0005430 A1 * 1/2012 Watanabe ............ G06F 3/0613 711/130
2012/0030348 A1 2/2012 Shi et al.
2012/0246386 A1 * 9/2012 Akutsu .................. G06F 3/061 711/103

FOREIGN PATENT DOCUMENTS

JP 2003-256150 A 9/2003
JP 2010-128911 A 6/2010
JP 2012-533781 A 12/2012

* cited by examiner

*Primary Examiner* — Reba I Elmore
(74) *Attorney, Agent, or Firm* — Volpe and Koenig, P.C.

(57) ABSTRACT

The present invention provides a storage subsystem accessing a storage resource efficiently to thereby enhance throughput. The storage subsystem adopts a configuration where respective processor packages have ownership of the respective LDEVs, wherein an I/O command from a host specifying an address extending over a division position within a single LDEV is divided, and the I/O processing is executed in a shared manner by multiple processor packages. The I/O processing is executed by allocating a processor package that processes a specific storage area with priority.

12 Claims, 27 Drawing Sheets

FIG. 2

| # | POSITION FOR DIVIDING LDEV | DIVISION NUMBER | COMPONENT CONTROLLING LDEV DIVISION | SUMMARY |
|---|---|---|---|---|
| 1 | FIXED (LDEV IS EVENLY DIVIDED INTO FORMER/LATTER HALF) | DIVIDED INTO 2 | MP ONLY | - LR assigns I/O to owner MPPK of former half LDEV<br>- MP of owner MPPK of former half LDEV executes following processes<br>- I/O processing of former half LDEV<br>- I/O dispatch processing to owner MPPK of latter half LDEV<br>- Processing of former/latter half extend-over I/O<br>- Owner MPPK of latter half LDEV performs I/O processing of latter half LDEV |
| 2 | | | LR + MP | - LR assigns I/O to owner MPPK of former half LDEV and owner MPPK of latter half LDEV (Owner MPPK of former LDEV is in charge of former/latter half extend-over I/O)<br>- MP of owner MPPK of former half LDEV executes following processes<br>- I/O processing of former half LDEV<br>- Processing of former/latter half extend-over I/O<br>- Owner MPPK of latter half LDEV performs I/O processing of latter half LDEV |
| 3 | | | LR ONLY | - LR assigns I/O to owner MPPK of former half LDEV and owner MPPK of latter half MPPK<br>- LR processes former/latter half extend-over I/O |
| 4 | VARIABLE (LEARNED) | DIVIDED INTO 2 | MP ONLY<br>LR + MP<br>LR ONLY | - I/O range is stored in units smaller than volume (such as DP page), and the division position of LDEV where extend-over of former/latter half is minimized is learned, based on which position for dividing LDEV is changed dynamically |
| 5 | VARIABLE (LEARNED) | DIVIDED INTO MULTIPLE AREAS | MP ONLY<br>LR + MP<br>LR ONLY | Based on performance requirement of LDEV and actual performance, the number of division of LDEV is determined based on number of MPPKs sharing the process (including an option of not dividing the LDEV) |
| 6 | VARIABLE (UPPER COOPERATION) | DIVIDED INTO MULTIPLE AREAS | MP ONLY<br>LR + MP<br>LR ONLY | - Embodiment considers having disk areas of multiple VMs included in one LDEV, where I/O of certain VM must be prioritized<br>- DKC acquires range of disk area per VM from upper component (such as VM management server), and allocate dedicated MPPK to that range |

| LDEV # (701) | OWNER MPPK (702) |
|---|---|
| 0 | 0 |
| 1 | 2 |
| 2 | 0 |
| · · · | · · · |
| 6 5 5 3 4 | 1 |
| 6 5 5 3 5 | 3 |
| · · · | · · · |

| | | | | |
|---|---|---|---|---|
| 501 LDEV # | 0 | 1 | 2 | · · · |
| 502 OWNER MPPK | 0 | 2 | 0 | · · · |
| 503 DIVISION NUMBER | 2 | 1 | 2 | · · · |
| 504 LATTER HALF OWNER MPPK | 2 | 2 | 2 | · · · |
| 505 BOUNDARY LBA | 0 x a a | 0 x a a | 0 x b b | · · · |

FIG.15

(a) JCB PROCESSED ONLY IN FORMER HALF:
DIVISION SOURCE AND DIVISION DESTINATION MP # ARE SAME

| ITEM | VALUE |
|---|---|
| JOB STATUS | run |
| START LBA | 0x00 |
| TRANSFER LENGTH TL | 0x20 |
| DIVISION SOURCE MP | 0 |
| DIVISION DESTINATION MP | 0 |
| DIVISION SERIAL NO. | 0 |
| DIVISION DESTINATION JOB STATUS | - |

(b) JCB PROCESSED ONLY IN LATTER HALF:
DIVISION SOURCE AND DIVISION DESTINATION MP # DIFFER (b1) DIVISION SOURCE (MP#0)

| ITEM | VALUE |
|---|---|
| JOB STATUS | WAIT DIVISION |
| START LBA | - |
| TRANSFER LENGTH TL | - |
| DIVISION SOURCE MP | 0 |
| DIVISION DESTINATION MP | 2 |
| DIVISION SERIAL NO. | 1 |
| DIVISION DESTINATION JOB STATUS | run |

(b2) DIVISION DESTINATION (MP#2)

| ITEM | VALUE |
|---|---|
| JOB STATUS | run |
| START LBA | 0x30 |
| TRANSFER LENGTH TL | 0x10 |
| DIVISION SOURCE MP | 0 |
| DIVISION DESTINATION MP | 2 |
| DIVISION SERIAL NO. | 1 |
| DIVISION DESTINATION JOB STATUS | - |

(c) JCB PROCESSING EXTENDING OVER FORMER AND LATTER HALF:
DIVISION SOURCE AND DIVISION DESTINATION MP # DIFFER (c1) DIVISION SOURCE (MP #0)

| ITEM | VALUE |
|---|---|
| JOB STATUS | run |
| START LBA | 0x00 |
| TRANSFER LENGTH TL | 0x20 |
| DIVISION SOURCE MP | 0 |
| DIVISION DESTINATION MP | 2 |
| DIVISION SERIAL NO. | 1 |
| DIVISION DESTINATION JOB STATUS | run |

(c2) DIVISION DESTINATION (MP #2)

| ITEM | VALUE |
|---|---|
| JOB STATUS | run |
| START LBA | 0x20 |
| TRANSFER LENGTH TL | 0x10 |
| DIVISION SOURCE MP | 0 |
| DIVISION DESTINATION MP | 2 |
| DIVISION SERIAL NO. | 1 |
| DIVISION DESTINATION JOB STATUS | - |

| VIRTUAL VOL_ID (2201) | VIRTUAL PAGE ID (2202) | TOTAL NUMBER OF I/O (2203) | NUMBER OF EXTEND-OVER I/O (2204) |
|---|---|---|---|
| 1 | 1 | 100 | 1 |
| | 2 | 50 | 2 |
| | 3 | 10 | 1 |
| | 4 | 20 | 1 |
| | 5 | 50 | 4 |
| | 6 | 70 | - |
| . . . | . . . | . . . | . . . |
| 2 | 1 | 200 | 10 |
| . . . | . . . | . . . | . . . |

| VIRTUAL VOL_ID (2701) | START VIRTUAL PAGE ID (2702) | END VIRTUAL PAGE ID (2703) | OWNER MPPK (2704) |
|---|---|---|---|
| 1 | 1 | 100 | 1 |
| ... | ... | ... | ... |

| VIRTUAL VOL_ID (2701) | OWNER MPPK (2802) |
|---|---|
| 1 | 2 |
| 2 | 2 |
| 3 | 2 |
| ... | ... |

| VIRTUAL VOL_ID (2701) | VIRTUAL PAGE ID (2902) | REAL VOL_ID (2903) | REAL PAGE ID (2904) |
|---|---|---|---|
| 1 | 1 | 10 | 1 |
| 1 | 2 | NULL | NULL |
| ... | ... | ... | ... |

| REAL VOL_ID (2903) | REAL PAGE ID (2904) | ALLOCATION FLAG (3003) |
|---|---|---|
| 10 | 1 | ALLOCATED |
| ... | ... | ... |

| HOST ID (3101) | IP ADDRESS (3102) |
|---|---|
| 1 | 192.168.0.1 |
| 2 | 192.168.0.2 |
| 3 | 192.168.0.3 |
| ... | ... |

| STORAGE ID (3201) | IP ADDRESS (3202) |
|---|---|
| 1 | 192.168.0.128 |
| ... | ... |

| HOST ID (3101) | VM_ID (3302) | STORAGE ID (3201) | VIRTUAL VOL_ID (2701) | STORAGE AREA START ADDRESS (3305) | STORAGE AREA END ADDRESS (3306) | PRIORITY (3307) |
|---|---|---|---|---|---|---|
| 1 | 1 | 1 | 1 | 1 | 1000 | PRIORITIZED |
| 1 | 2 | 1 | 1 | 1001 | 2000 | NON-PRIORITY |
| 1 | 3 | 1 | 1 | 2001 | 3000 | NON-PRIORITY |
| 2 | 4 | 1 | 2 | 1 | 1000 | NON-PRIORITY |
| 2 | 5 | 1 | 2 | 1001 | 2000 | NON-PRIORITY |
| 3 | 6 | 1 | 3 | 1 | 1000 | NON-PRIORITY |
| 3 | 7 | 1 | 3 | 1001 | 2000 | NON-PRIORITY |
| ... | ... | ... | ... | ... | ... | ... |

HOST SETTING SCREEN — 340

- HOST ID
- IP ADDRESS
- OK / Cancel

STORAGE SETTING SCREEN — 350

- STORAGE ID
- IP ADDRESS
- OK / Cancel

REAL VOL SETTING SCREEN — 360

- STORAGE ID
- REAL VOL_ID
- CAPACITY
- OK / Cancel

370

VIRTUAL VOL SETTING SCREEN

STORAGE ID

VIRTUAL VOL_ID

CAPACITY

OWNER MPPK

OK    Cancel

380

VM SETTING SCREEN

HOST ID

VM_ID

STORAGE ID

VIRTUAL VOL_ID

OK    Cancel

390

PRIORITIZED VM SETTING SCREEN

VM_ID

OWNER MPPK

OK    Cancel

STORAGE SUBSYSTEM AND METHOD FOR CONTROLLING THE STORAGE SUBSYSTEM

TECHNICAL FIELD

The present invention relates to a storage subsystem and a method for controlling the storage subsystem.

BACKGROUND ART

In prior-art storage subsystems, volumes used as storage areas adopting RAID (Redundant Arrays of Independent (Inexpensive) Disks) technique are provided to host computers using multiple hard disk drives as storage resources. In prior-art storage systems, processor packages are multiplexed to enhance access efficiency, and multiple processors are loaded in each processor package. The operations of the multiple processors are controlled via internal control information.

Patent Literature 1 discloses an art for improving the access efficiency. The disclosed technique provides ownership for accessing the respective storage resources to each processor package, based on which access competition and access arbitration among processor packages can be reduced. Further, Patent Literature 2 discloses an art for dynamically changing the processing target based on the load of each processor package to realize load distribution, to thereby improve the processing performance.

CITATION LIST

Patent Literature

[PTL 1] US Patent Application Publication No. 2012/0005430

[PTL 2] US Patent Application Publication No. 2012/0030348

SUMMARY OF INVENTION

Technical Problem

According to the prior art, a single processor package is in charge of processing a single logical device (LDEV), so that even when the storage capacity of one LDEV is extremely high or when load is concentrated to a specific LDEV, I/O (input/output) processing had to be performed by a single processor package. Therefore, the prior art technique had a drawback of possible deterioration of I/O processing performance or response performance to host computers. Therefore, the object of the present invention is to provide a storage subsystem capable of accessing storage resources efficiently and enabling improvement of throughput.

Solution to Problem

In order to solve the above problems, the present invention provides a storage subsystem in which the respective processor packages have ownership of respective LDEVs, wherein an I/O command from a host computer designating an address extending over a division position within a single LDEV is divided, and processing is performed in a shared manner by multiple processor packages. Further according to the present invention, a processor package performing processing of a specific storage area in a prioritized manner is allocated to process the I/O from the host computer.

Advantageous Effects of Invention

According to the storage subsystem of the present invention, the accesses to a single LDEV can be processed in parallel and simultaneously by multiple processor packages, so that the I/O processing time can be shortened, and throughput of the system can be improved. Problems, configurations and effects other than those described above will become apparent by the following description of preferred embodiments.

BRIEF DESCRIPTION OF DRAWINGS

FIG. 2 is a view summarizing the respective preferred embodiments.

FIG. 7 is a view illustrating a configuration example of an MPPK search table.

FIG. 8 is a view illustrating a configuration example of an ownership management table.

FIG. 15 is a view illustrating a configuration example of JCBs for respective I/O division patterns.

FIG. 22 is a view illustrating a configuration example of a table for managing the number of I/Os according to fourth and fifth embodiments.

FIG. 27 is a view illustrating a configuration example of a priority area management table according to a storage subsystem.

FIG. 28 is a view illustrating a configuration example of an ownership management table in a storage subsystem.

FIG. 29 is a view illustrating a configuration example of a mapping management table in a storage subsystem.

FIG. 30 is a view illustrating a configuration example of a real page management table in a storage subsystem.

FIG. 31 is a view illustrating a configuration example of a host management table in a management server.

FIG. 32 is a view illustrating a configuration example of a storage management table in a management server.

FIG. 33 is a view illustrating a configuration example of a VM management table in a management server.

DESCRIPTION OF EMBODIMENTS

Figure 1:
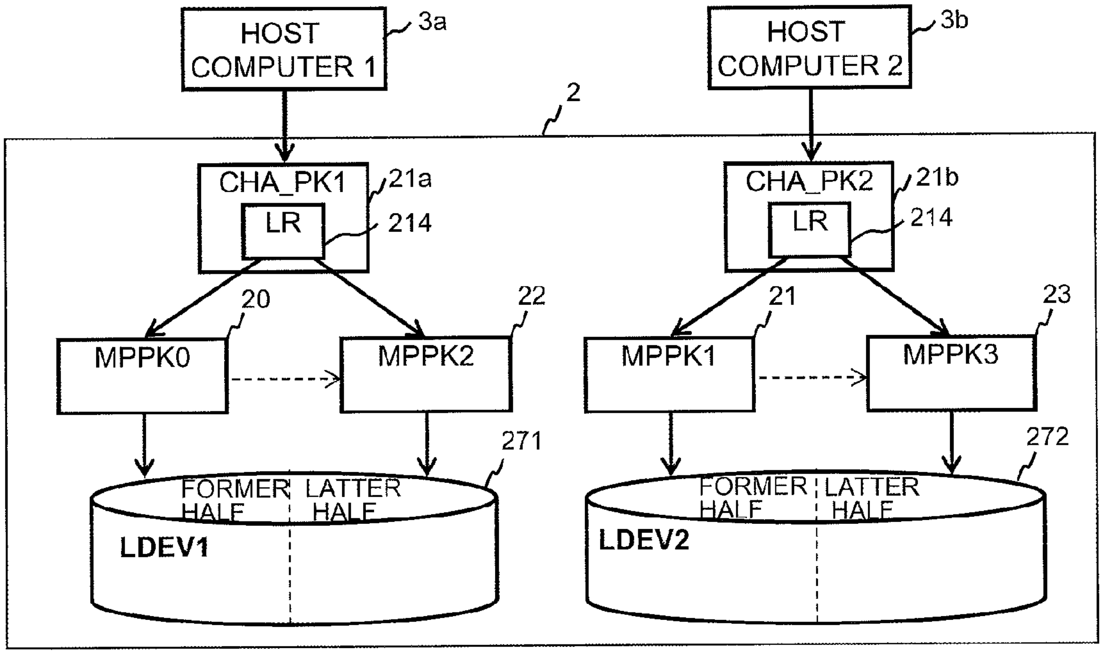
FIG. 1 is a view illustrating a concept of the present invention.

Now, the preferred embodiments of the present invention will be described with reference to the drawings. In the following description, various information are referred to as "management tables", for example, but the various information can also be expressed by data structures other than tables. Further, the "management table" can also be referred to as "management information" to indicate that the information does not depend on the data structure.

The processes are sometimes described using the term "program" as the subject. The program is executed by a processor such as an MP (Micro Processor) or a CPU (Central Processing Unit) for performing determined processes. A processor can also be the subject of the processes since the processes are performed using appropriate storage resources (such as memories) and communication interface devices (such as communication ports). The processor can also use dedicated hardware in addition to the CPU. The computer programs can be installed to each computer from a program source. The program source can be provided via a program assignment server or a storage media, for example.

Each element, such as each controller, can be identified via numbers, but other types of identification information such as names can be used as long as they are identifiable information. The equivalent elements are denoted with the same reference numbers in the drawings and the description of the present invention, but the present invention is not restricted to the present embodiments, and other modified examples in conformity with the idea of the present invention are included in the technical scope of the present invention. The number of each component can be one or more than one, unless defined otherwise.

<Concept>

FIG. 1 is a view illustrating a concept of the present invention. FIG. 2 is a view illustrating the summary of respective embodiments. In the present embodiment, a storage subsystem 2 provides an ownership to an MPPK (Micro Processor Package) for accessing an LDEV (Logical Device) as storage resource, and controls the accesses to the LDEV. The storage subsystem 2 constitutes a RAID group using multiple storage drives, and the RAID group is divided into multiple logical devices, or LDEVs. In contrast, there are cases where multiple RAID groups constitute a single large LDEV.

Further, the prior-art storage subsystem determines the MPPK performing processes for each LDEV unit. This is called an ownership of the LDEV, and only the MPPK having the ownership can perform input and output control of the LDEV. The MPPK is an MP package loading multiple high-performance MPs (semiconductor devices executing basic computation and I/O request processing within the storage subsystem), and each MP processes the commands from a host computer (hereinafter referred to as host) and controls accesses to the LDEV.

As described, regardless of the size of the storage capacity of the LDEV, a single MPPK had been allocated to a single LDEV to process the I/O commands, so that the prior art system had a drawback in which the access performance to a large-capacity LDEV was deteriorated compared to the access performance to a small-capacity LDEV, and the response time from the host to the storage subsystem was elongated.

Therefore, the present embodiment adopts a configuration in which multiple MPPKs having ownership are allocated to each LDEV unit, and TO accesses from the host 3 are shared among MPPKs and processed simultaneously. Therefore, as shown in FIG. 1, an LDEV1 271 accessed from a host 3*a* is divided into a former half section and a latter half section, and an MPPK0 20 and an MPPK2 22 processing I/O accesses to the respective sections are assigned. Similarly, an LDEV2 272 accessed from a host 3*b* is divided, and an MPPK1 21 and an MPPK3 23 are assigned thereto.

Thereafter, when an I/O command from the host 3 to the LDEV is received by a CHA_ PK (Channel Adapter Package) 1 21*a* or a CHA_PK2 21*b*, an LR (a controller loaded in the CHA or DKA for assigning the I/O command to an appropriate MPPK) 214 of the CHA_PK specifies an MPPK having an ownership to the LDEV via an MP search table mentioned later, and sends an I/O command to the MPPK. CHA_PK refers to multiple CHAs gathered into a single package. Further, a CHA is a controller in charge of executing processes regarding the host and acts as an external interface of the storage subsystem, which is coupled to a host and sends the I/O requests from the host via an LR (Local Router) to an appropriate MPPK.

Actually, the I/O command to the former half of the LDEV1 271 is processed by the MPPK0 20, the I/O command to the latter half is processed by the MPPK2 22, and the I/O command extending over both the former half and the latter half is processed by the MPPK0 20 alone or by both MPPKs. FIG. 1 illustrates an example where the LDEV is divided into two sections, but it is possible to divide the LDEV into three or more sections and to have different MPPKs assigned to each divided area.

As described, by processing a single I/O command by multiple MPPKs, the access performance to the LDEV is improved and the response time from the storage subsystem 2 to the host 3 can be shortened. Hereafter, six preferred embodiments (position for dividing the LDEV, the division number, the component controlling division of LDEV) illustrated in FIG. 2 will be described. In the following preferred embodiments, an example is illustrated in which the I/O processing is shared in MPPK units, but it is possible to have the I/O processing shared among multiple MPs within the same MPPK.

Embodiment 1

Overall System

Figure 3:
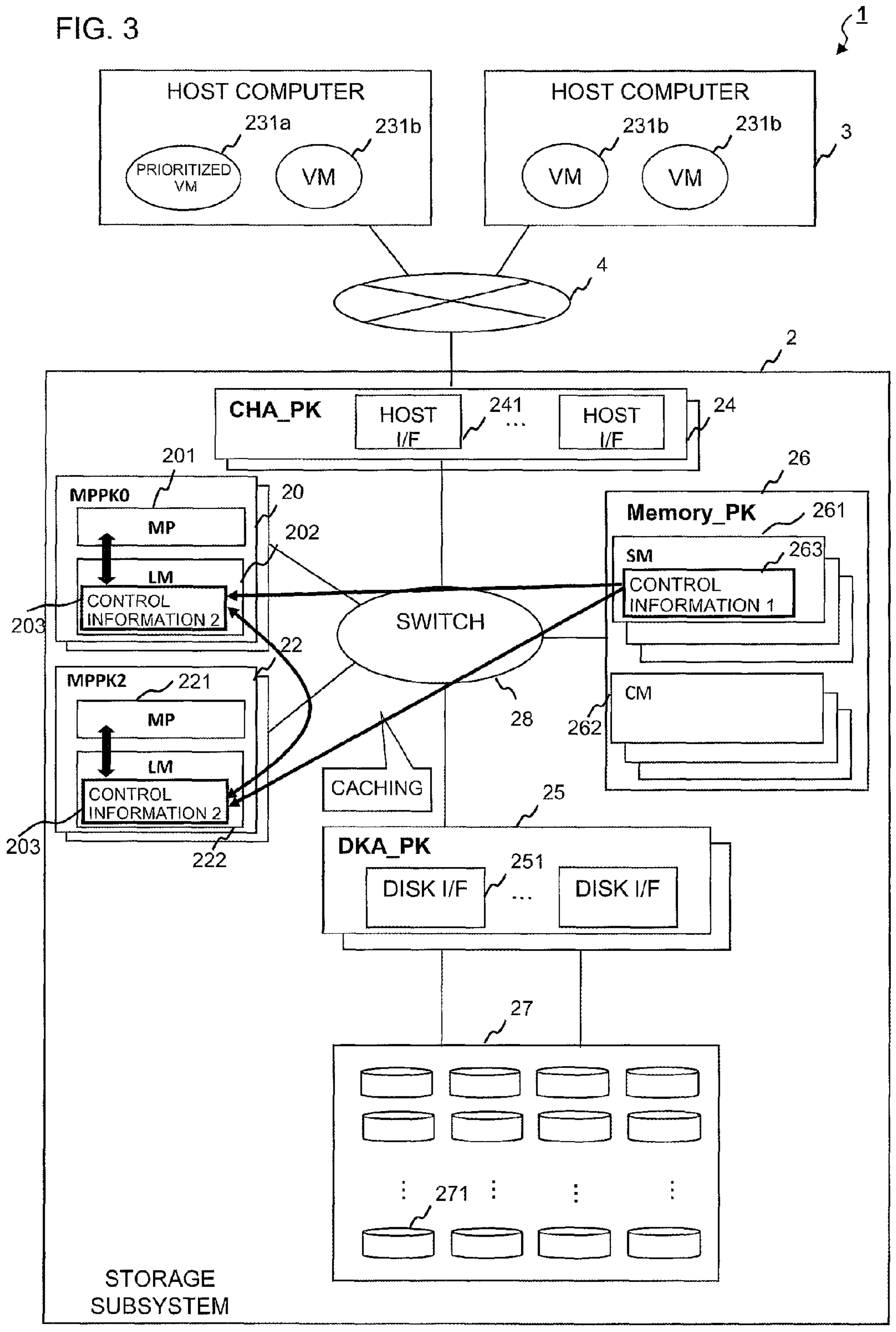
FIG. 3 is a block diagram illustrating a configuration of the overall system including the storage subsystem.

FIG. 3 is a block diagram illustrating a configuration of an overall system including the storage subsystem. The storage subsystem 2 is coupled via a network 4 with multiple hosts 3. In the host 3, one or more VMs (Virtual Machines) 231 which are computers virtually constructed via software are operated, and the VM 231 includes a prioritized VM (described later) 231*a* to which the MPPK performs allocation with priority.

The storage subsystem 2 comprises multiple CHA_PKs 24 coupling with multiple hosts 3, and each CHA_PK 24 has multiple host I/Fs 241 built therein. A memory PK 26 includes an SM (Shared Memory) 261 storing control information 1 263 and the like, and a CM (Cache Memory) 262 temporarily storing data from the hosts 3 and the storage drive 271.

An MPPK 20 has multiple MPs 201, and LMs (Local Memories) storing control programs executed in the MP 201, various tables, control information 2 203 and the like. Other MPPKs 22 have similar configurations. A control information 2 203 caches a portion of the information of the control information 1 263 and shares the same information, and stores I/O commands from the host 3. By having the MP cache the control information 2 used for each I/O to an LM 203/223 having a short access time, high-speed processing in the MP becomes possible since the number of accesses to the SM 263 having a long access time can be reduced.

The DKA_PK 25 is a controller in charge of controlling the RAID group, which writes the write data in the CM to the storage drive 271 via a disk I/F 251, and reads data from the storage drive 271 based on a read request from the host 3. A drive unit 27 has multiple storage drives 271, and read/write accesses thereof are controlled via a DKA_PK 25. The components are mutually coupled via a switch 28, and data, commands and control information are communicated via the switch.

<Internal Configuration of CHA_PK>

Figure 4:
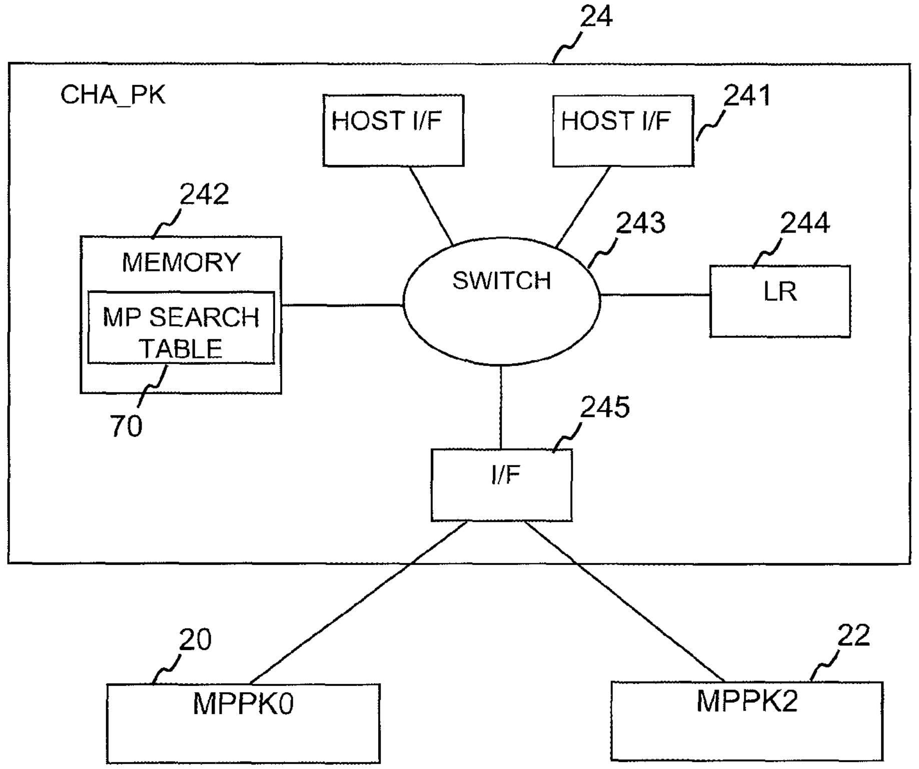
FIG. 4 is a block diagram illustrating an internal configuration of CHA_PK.

FIG. 4 is a block diagram illustrating an internal configuration of a CHA_PK. The CHA_PK 24 is composed of multiple host I/Fs 241 coupling the hosts 3 and the storage subsystem 2, a memory 242 storing control information and tables (such as the MP search table 70) used by the various controllers, an LR 244, and an I/F controller 245 for coupling to the MPPK 20/22, wherein the respective components are mutually coupled via a switch 243.

The I/O command from the host 3 is acquired by the LR 244 via the host I/F 241, and the I/O command is transferred to an appropriate MPPK according to the setting of the MP search table 70.

<Control Information in SM>

Figure 5:
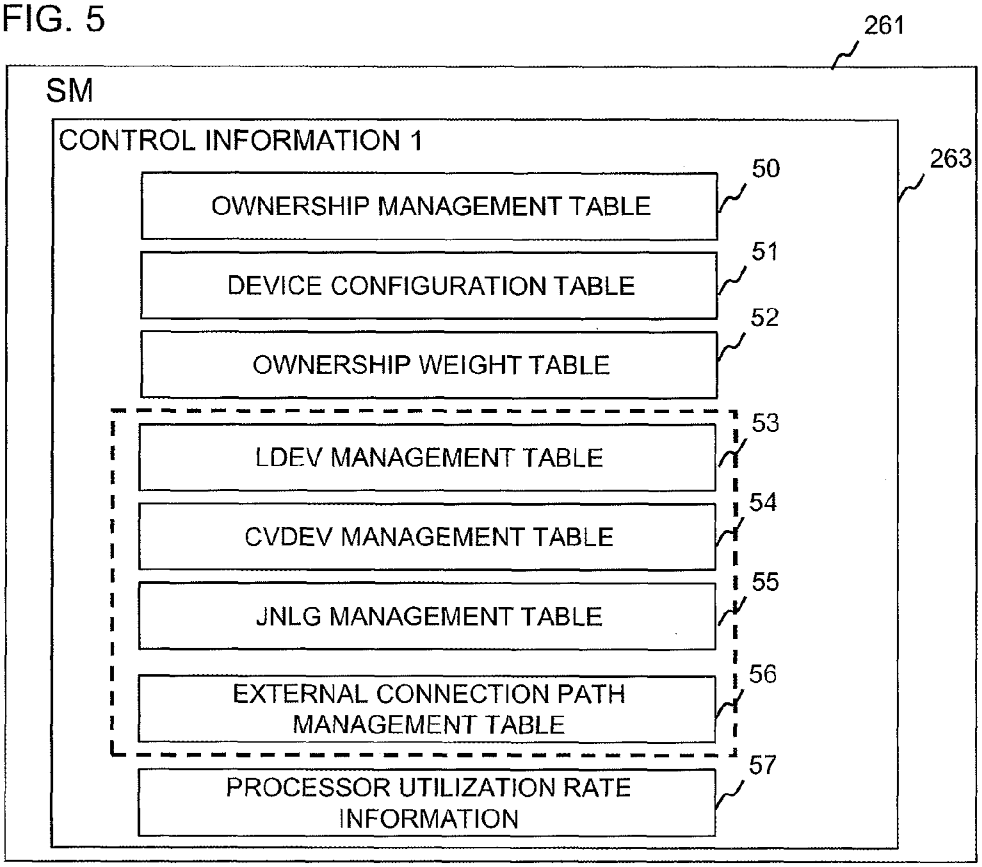
FIG. 5 is a view illustrating a configuration example of a control information stored in an SM.

FIG. 5 is a view illustrating a configuration example of a control information stored in the SM. An SM (Shared Memory) 261 stores as control information 1 263 an ownership management table 50, a device configuration information table 51, an ownership weight table 52, an LDEV management table 53, a CVDEV (Cache VDEV) management table 54, a JNLG (Journal Group) management table 55, an external connection path management table 56, and a processor utilization rate information 57.

The ownership management table 50 is a table for managing ownership related to whether or not each MPPK is capable of accessing storage resources including volumes (LDEVs). In the present description, the table is described as a table managing the ownership related to LDEVs, but it is not restricted thereto. The device configuration information table 51 stores information for managing the information regarding the device configuration related to the storage subsystem 2.

The ownership weight table 52 is a table for managing the weighting used when allocating ownership to the MPPK related to the storage resources. The LDEV management table 53 is a table for managing volumes as storage areas composed of at least a single HDD 271. The CVDEV management table 54 is a table for managing at least one storage area in the CM 262 as volume. The JNLG management table 55 is a table for managing the journal groups.

The external connection path management table 56 is a table for managing the connection path of the expanded disk unit 27. The processor utilization rate information 57 is information related to the utilization rate of each MP included in the MPPK.

<Control Information in LM>

Figure 6:
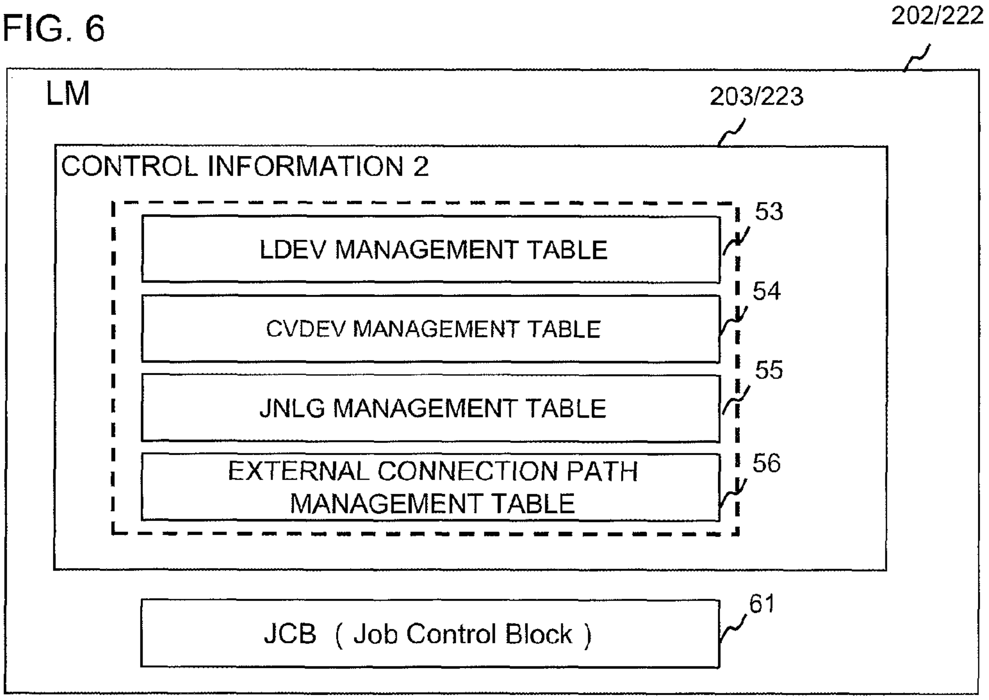
FIG. 6 is a view illustrating a configuration example of a control information stored in an LM.

FIG. 6 is a view showing a configuration example of a control information stored in the LM. As control information 2 203/223 on the LM 202/222, a JCB (Job Control Block) 61 which is a job control information created for each I/O command from the host 3 is stored in addition to the LDEV management table 53, the CVDEV management table 54, the JNLG management information 55 and the external connection path management table 56 in the SM 261.

<MP Search Table>

FIG. 7 is a view illustrating a configuration example of an MPPK search table. An MPPK search table 70 is a table for specifying the MPPK having ownership for performing processes to the LDEV accessed from the host 3, and includes an LDEV #701 and an owner MPPK 702. The LR 244 is an LDEV information (LDEV number) included in the I/O command from the host 3, for verifying and specifying an owner MPPK in charge of the processing in the MPPK search table 70. Then, the LR 244 transfers the I/O command from the host 3 to the specified MPPK.

<Ownership Management Table>

FIG. 8 is a view illustrating a configuration example of an ownership management table. An ownership management table 50 is a table for managing the information of one or more MPPKs in charge of the processing in LDEV units, and includes an LDEV #501, an owner MPPK 502 in charge of the processing of the LDEV #501, a division number 503 for dividing the LDEV into given numbers, a latter half owner MPPK 504 in charge of processing the divided section, and a boundary LBA (Logical Block Address) 505 showing the divided position.

For example, the LDEV having “0” as the LDEV #501 stores “2” as the division number 503, so that it is divided into two sections, and MPPK0 22 in which the owner MPPK 502 is “0” is in charge of processing the former half address range from 0x00 to 0xaa (boundary LBA), and MPPK2 22 in which the latter half owner MPPK 504 is “2” is in charge of processing the latter half address range starting from 0xaa (boundary LBA).

<I/O Processing>

Figure 9:
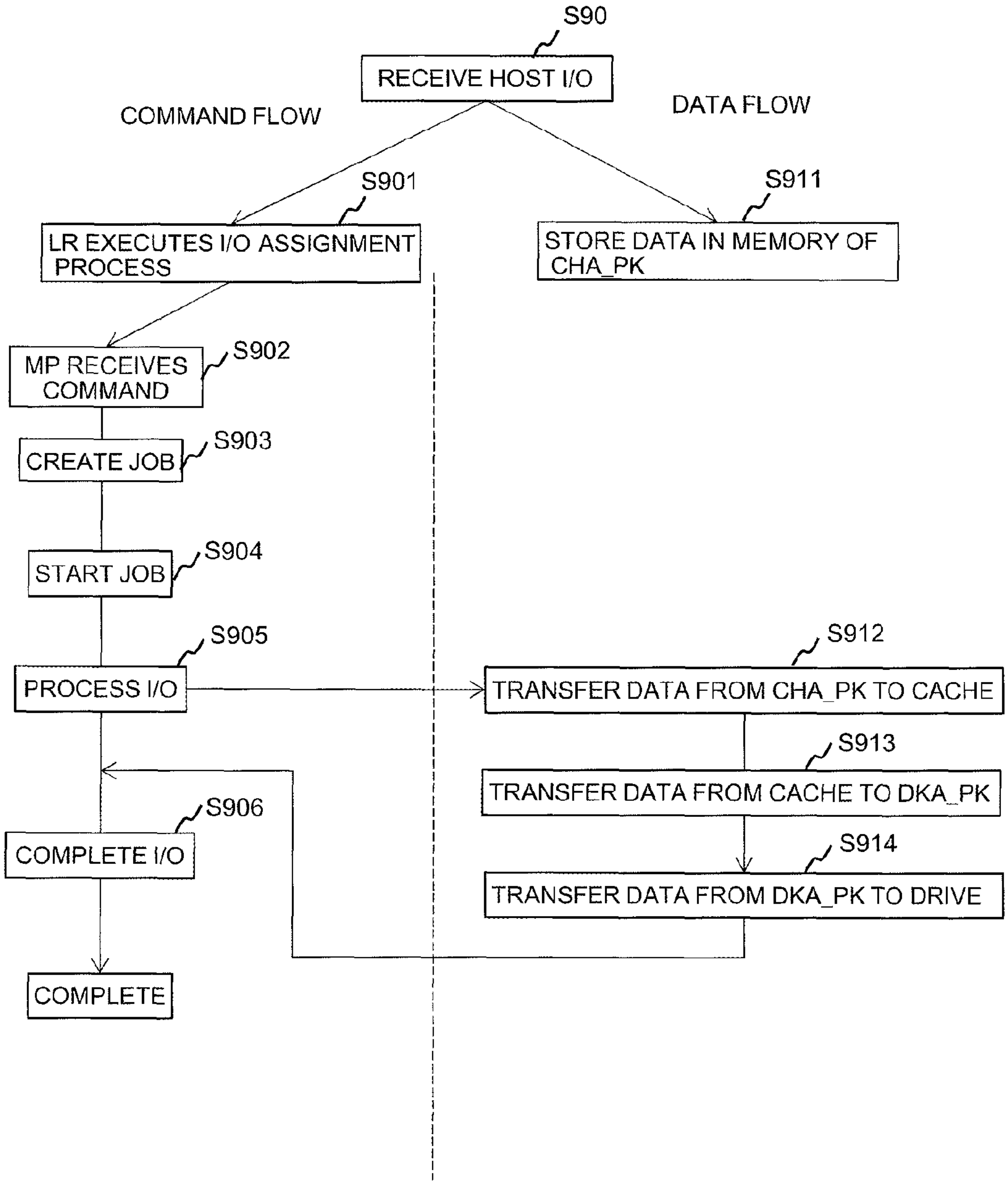
FIG. 9 is a flowchart illustrating an I/O processing according to a prior art.

FIG. 9 is a flowchart illustrating the I/O processing according to the prior art. The present processing is started when the storage subsystem 2 receives an I/O request from the host 3. In S90, the host I/F 241 transfers the I/O command of the I/O request to the LR 244, and in a write request, the write data is stored in the memory 242 of the CHA_PK 24 (S911).

In S901, the LR 244 analyzes the I/O request and confirms the command type. If the command type is a read command or a write command, the MPPK search table 70 is searched to specify the owner MPPK in charge of processing the access target LDEV designated by the LDEV number included in the command, and transfers the I/O command to the owner MPPK. In S902, the MP of the owner MPPK (for example, the MP 201) receives the I/O command. In S903, the MP 201 creates a JOB and stores the same as JCB 61 in the LM 202. In S904, JCB 61 is read from the LM 202 and the JOB is started.

Then, in S905, the MP 201 executes the I/O processing (from S912 to S914). In S912, the MP 201 transfers data from the memory 242 of the CHA_PK 24 to the CM 262. In S913, the MP 201 transfers data from the CM 262 to the DKA_PK 25, and in S914, data is transferred from the DKA_PK 25 to the storage drive 271 and written thereto. When all data are written, the DKA_PK 25 transmits a write complete notice to the MP 201. When the MP 201 receives the write complete notice, it ends the JOB, deletes the JCB 61 stored in the LM 202, and completes the I/O request processing.

Figure 10:
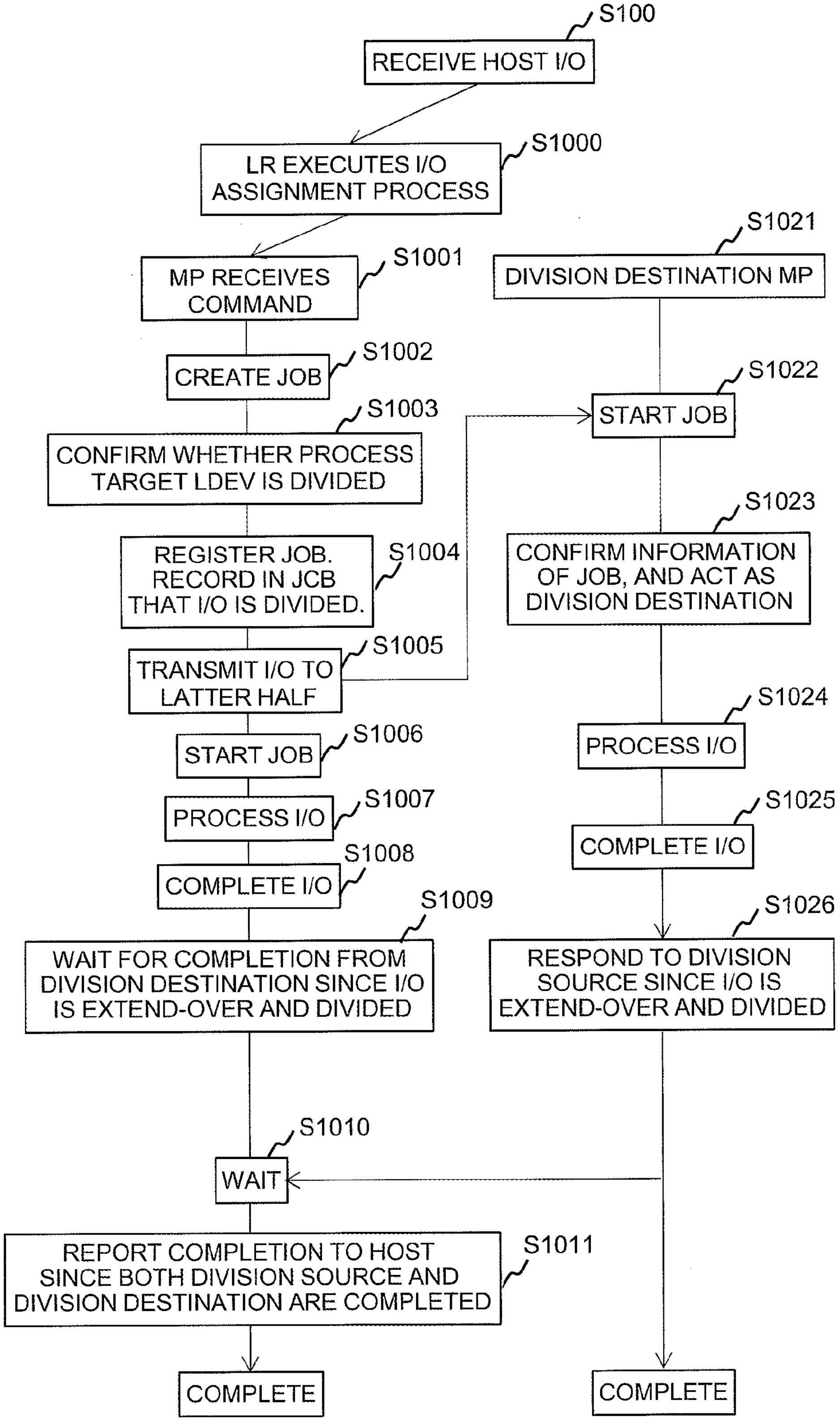
FIG. 10 is a flowchart illustrating an I/O processing according to a first embodiment.

FIG. 10 is a flowchart illustrating an I/O processing according to the first embodiment. The present embodiment differs from the prior art I/O processing in that multiple MPPKs process the accesses to a single LDEV. The LR 244 allocates the I/O to the owner MPPK of the former half LDEV, and the MP of the owner MPPK of the former half LDEV performs (a1) the I/O processing of the former half LDEV, (a2) a dispatch (task allocation) processing of I/O to the owner MPPK of the latter half LDEV, and (a3) I/O processing extending over the former half and the latter half. Further, the owner MPPK of the latter half LDEV performs I/O processing of the latter half LDEV. The processing is started when an I/O request from the host 3 is received by the storage subsystem 2.

In S100, the host I/F 241 transfers the I/O command of the I/O request to the LR 244. The processes from S1000 to S1002 are the same as the processes from S901 to S903.

In S1003, the MP (such as the MP 201) of the I/O command reception MPPK confirms whether the process target LDEV is divided or not based on the ownership management table 50. If the division number 503 is 1, it is recognized that the LDEV is not divided, and the same processes as the prior art are performed. If the division number 503 is two or more, the processes are divided, and ownership is assigned to the MPs of the respective MPPKs. The present embodiment is illustrated assuming that the division number 503 is 2.

In S1004, the MP 201 registers the JOB. If it is not divided, predetermined information (such as the JOB status, the start LBA, the transfer length and the division information) is set to the JCB 61 of the JOB executed by the MP 201 itself (former half MP). If it is divided, predetermined information is set to the JCB 61 of the JOB executed by another MP (such as the MP 221 or the latter half MP). The details of the JCB 61 will be described later.

In S1005, the MP 201 transmits an I/O processing request to the latter half MP 221. In S1006, the MP 201 starts the JOB based on the registered JCB 61. In S1007, the MP 201 requests I/O processing to the DKA_PK 25. The disk I/F 251 of the DKA_PK 25 executes the I/O processing (data read/write) to the storage drive 271. The disk I/F 251 transmits an I/O complete notice after completing the I/O processing to the MP 201. In S1008, the MP 201 determines that I/O processing has been completed when the I/O complete notice is received. In S1009, the MP 201 transits to a standby state (wait) to wait for the completion notice from the division destination MP 221, since the I/O command extends over both sections and the target is divided.

In S1021, the MP 221 which is a division target MP is in a standby state. In S1022, the MP 221 starts the JOB based on the JCB 61 of the received I/O processing request. Therefore, the MP 221 transits from a standby state to a normal operation state. In S1023, the MP 221 confirms the information of the JCB 61, and acts as the division destination MP. The processes of S1024 and S1025 are equivalent to the processes of S1007 and S1008. In S1026, since the command extends over both sections and the target is divided, the MP 221 transmits an I/O processing complete notice of the division destination to the division source MP (MP 201).

In S1010, the MP 201 receives an I/O complete notice from the MP 221, and returns from a standby state (wait) to transit to the normal operation state. In S1011, since I/O processing is completed in both the division source MP 201 and the division destination MP 221, the MP 201 notifies completion to the host 3. As described, the MP having received the I/O command sends a divided I/O command to the division destination MP, and after completing the I/O processing, the MP having received the command sends a response to the host.

The area of a single LDEV is divided into sections and the ownerships thereof are assigned to multiple MPs, but to the upper-side host 3, it is recognized as a single LDEV based on a conventional mapping. A boundary exists within the DKA_PK 25, and the processing MP differs before and after the boundary, so that the aforementioned processes (a1) through (a3) are performed for the I/O near the boundary. Now, we will illustrate an example where an I/O request to LDEV #0 has been received. The LR 244 determines that the owner is 0 based on the MP search table 70, and transfers the I/O command to the MPPK #0. The MP 201 within the MPPK #0 refers to the ownership management table 50 stored in the LM 202, and determines that the division number thereof is 2, and that the owner of the latter half is MPPK #2. Then, the MP 201 of the MPPK #0 determines the division method of I/O, and executes the processes from (a1) to (a3).

<I/O Assignment>

Figure 11:
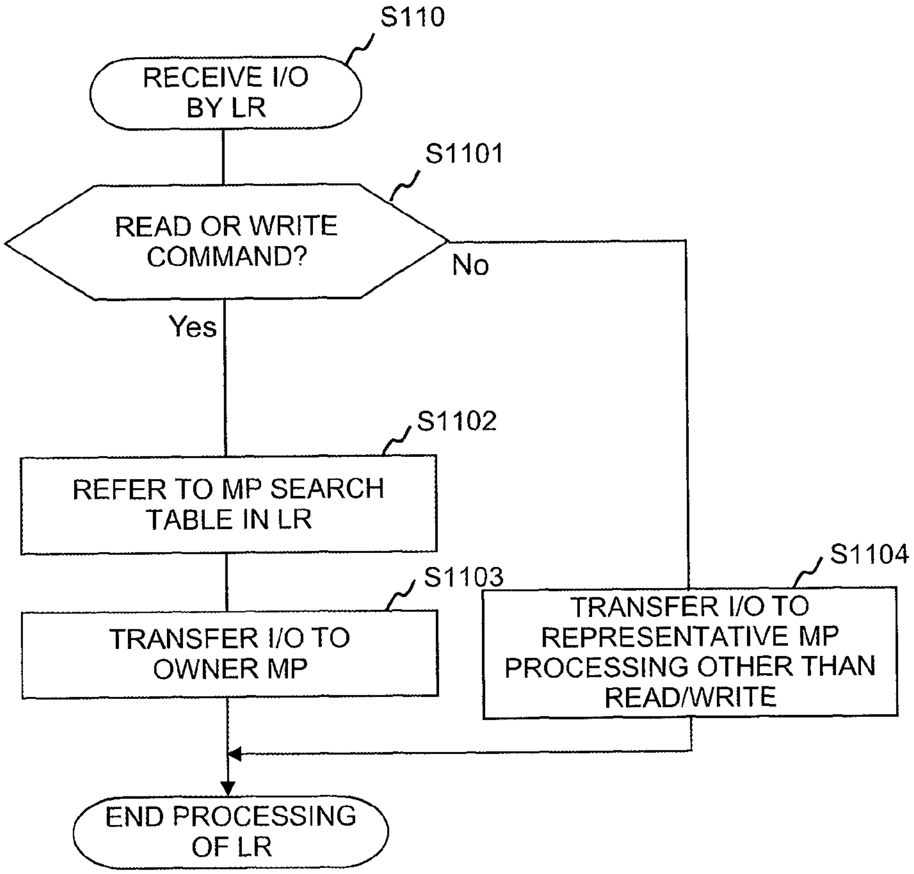
FIG. 11 is a flowchart illustrating an I/O processing in an LR.

FIG. 11 is a flowchart illustrating an I/O processing in the LR. The present processing is for assigning the I/O request to an owner MPPK, which is started when an I/O request from the host 3 is received by the LR 244 in S110.

In S1101, the LR 244 determines whether the command of the I/O request is a read or a write command. If the command is a read or a write command (Yes), the LR 244 executes S1102, and if not (No), it executes S1104. In S1102, the LR 244 refers to the MP search table 70, and specifies the owner MPPK in charge of processing based on the LDEV information (LDEV #) of the I/O request destination.

In S1103, the LR 244 transfers the I/O request to the MP of the owner MPPK. In S1104, the LR 244 transfers the I/O request to a representative MP processing the processes other than read/write. A representative MP refers to an MP out of the multiple MPs that executes processes other than read/write in a prioritized manner. In the present embodiment, the representative MP can receive an I/O command either directly from the host 3 or via the LR 244, so as to determine I/O assignment and divide I/O processing. Further, the representative MP can behave as a division source MP, and execute I/O processing by cooperating with the division destination MP.

<I/O Processing Via MP to which I/O is Assigned>

Figure 12:
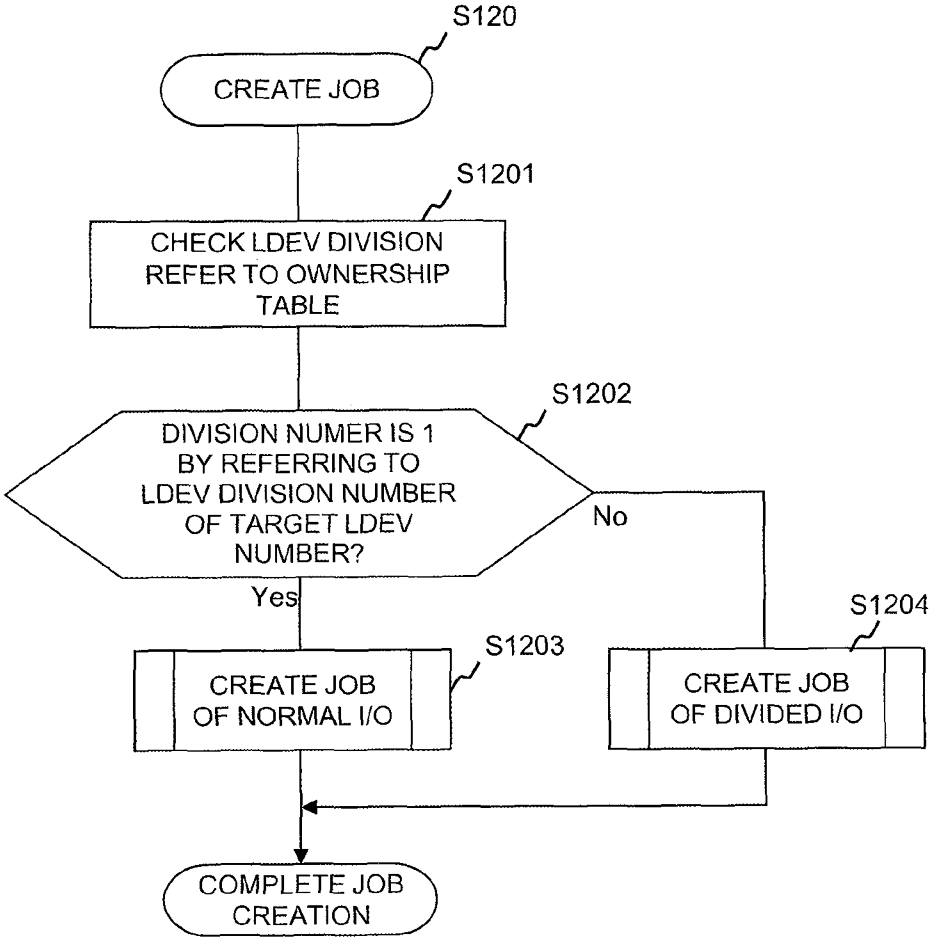
FIG. 12 is a flowchart illustrating an I/O processing in an MPPK to which I/O is assigned.

FIG. 12 is a flowchart illustrating an I/O processing in an MP of the MPPK to which the I/O has been assigned. The present process S120 is a process for determining whether the processing is a normal I/O processing or a division I/O processing, and to create a JOB.

In S1201, the owner MP executes an LDEV division check. That is, the owner MPPK refers to the division number 503 of the ownership management table 50. In S1202, the owner MP refers to the division number of the LDEV based on the division number 503 of the processing target LDEV number, and determines whether the division number is 1 or not. If the division number is 1 (Yes), the owner MP executes S1203, and if the division number is not 1 but 2 or greater (No), the MP executes the process of S1204.

In S1203, the owner MP creates a JOB of a normal I/O. The JOB of a normal I/O executes the prior art I/O processing described with reference to FIG. 9. In S1204, the owner MP generates a JOB of a division I/O. The owner MP ends the present processing after completing JOB creation.

<Division Pattern Based on I/O Access Position and Transfer Length>

Figure 13:
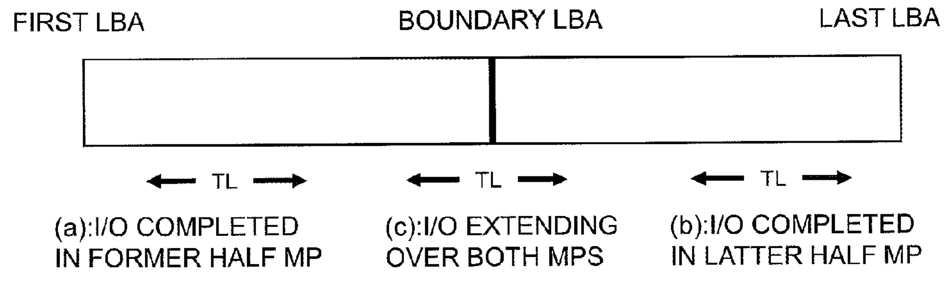
FIG. 13 is a frame format view of a division pattern illustrating a relationship between an I/O access position and a transfer length.

FIG. 13 is a frame format illustrating the relationship of the division pattern based on the I/O access position and the transfer length. The LDEV has a storage capacity of an address range from a start LBA to a last LBA. In the present example, the division number is set to 2, so that a boundary (boundary LBA) is provided at a position corresponding to half the storage capacity, and different MPPKs in charge of processing are assigned to the former and latter sections.

The allocation is divided into three I/O categories, which are (a) an I/O completed by the former half MP, (b) an I/O completed by the latter half MP, and (c) I/O that extends over both MPs. If the address area from the start LBA of the I/O access corresponding to the transfer length TL fits within the start LBA and the boundary LBA, the I/O is (a) I/O that is completed in the former half MP, if it extends over the boundary LBA, the I/O is (c) I/O that extends over both MPs, and if it fits within the boundary LBA and the final LBA, the I/O is (b) I/O that is completed in the latter half MP.

<JOB Creation Processing of Division I/O>

Figure 14:
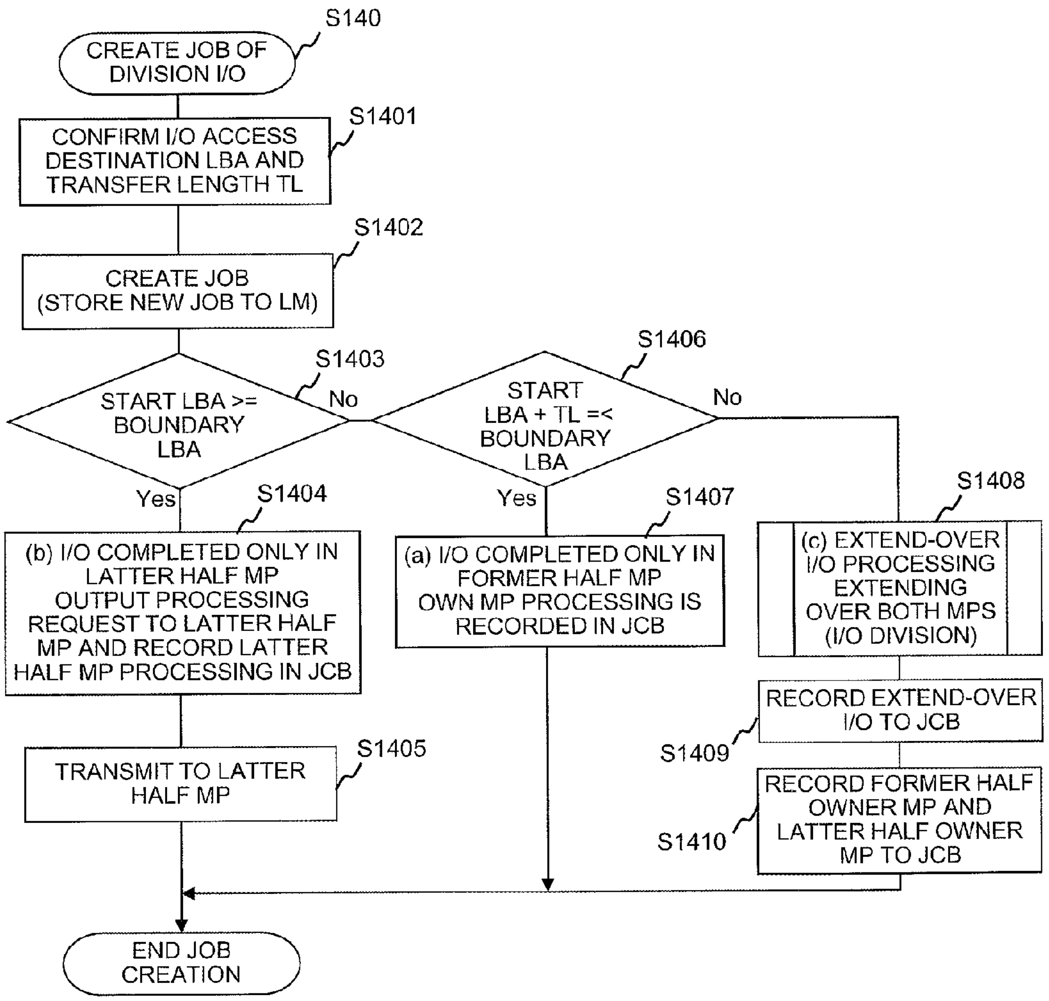
FIG. 14 is a flowchart illustrating a JOB creation processing of a division I/O.

FIG. 14 is a flowchart illustrating a JOB creation processing of a division I/O. The present processing S140 is a process for creating a JOB by the MPPK (or the MP) to which the I/O command is assigned from the LR 244 for each I/O division pattern. The MP to which the I/O command has been assigned acts as the MP 201.

In S1401, the MP 201 confirms the start LBA of the I/O access and the transfer length TL in the I/O command. In S1402, the MP 201 creates a JOB and stores a new JCB 61 in the LM 202. In S1403, the MP 201 determines whether the start LBA is equal to or greater than the boundary LBA or not. If it is greater (Yes), the MP 201 executes S1404, and if not, it executes S1406.

In S1406, the MP 201 determines whether the result having added the transfer length TL to the start LBA (IO access end LBA) is equal to or smaller than the boundary LBA. If it is equal to or smaller (Yes), the MP 201 executes S1407, and if it is greater (No), it executes S1408.

In S1404, the MP 201 determines that the I/O is (b) I/O that is completed only by the latter half MP, and stores the processing request to the latter half MP (MP 221) and the latter half MP processing information to the JCB 61 used by the JOB execution of the latter half MP (MP 221). In S1405, the MP 201 transmits an I/O processing request to the latter half MP.

Figure 16:
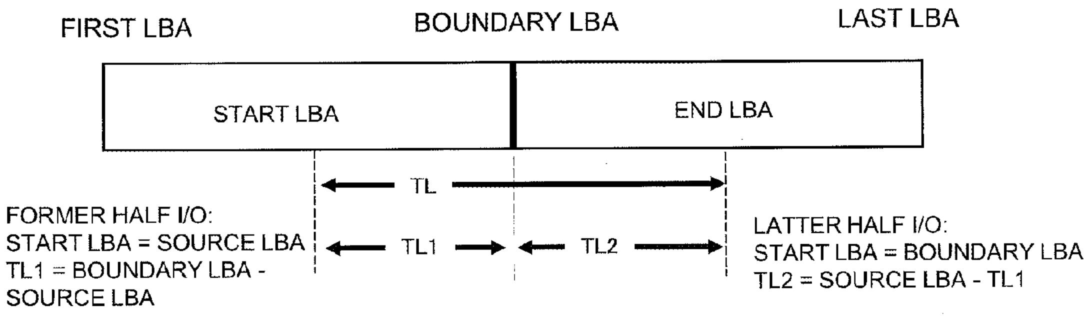
FIG. 16 is a frame format view illustrating a relationship between an extend-over I/O division position and a transfer length.

In S1407, the MP 201 determines that the I/O is (a) I/O that is completed by the former half MP (MP 201 itself), and stores the former half MP processing information to the JCB 61. In S1408, the MP 201 performs (c) I/O extend-over processing (I/O division) that extends over both MPs. This processing divides the I/O as shown in FIG. 16. In S1409, the MP 201 stores the extend-over I/O processing information to the JCB 61 for the former half MP and the JCB 61 for the latter half MP. Further, in S1410, the MP 201 stores the former half owner MP 201 to the JCB 61 for the former half MP, and stores the latter half owner MP 221 to the JCB 61 for the latter half MP. When the storing to all JCBs 61 have been completed, the MP 201 ends the JOB creation processing.

<JCB Per Division Pattern>

FIG. 15 is a view illustrating a configuration example of a JCB per I/O division pattern. The JCB 61 is composed of a JOB status indicating the execution status (execution (run), wait for division) of the JOB, an I/O access start LBA, a transfer length TL, a division source MP number, a division destination MP number, a division serial number, and a division destination JOB status. The division serial number also indicates the division number, wherein 0 represents no division, 1 represents division into two sections, and 2 represents division into three sections.

(a) JCB processed only by the former half: The division source MP # and the division destination MP # are the same.

(b) JCB processed only by the latter half: The division source MP # and the division destination MP # differ.

(b1) JCB of the division source MP (MP #0): The JOB status is set to “wait for division” and it is in a standby state, and wherein the division destination JOB status is set to “run” and in executed status. Further the entries of the start LBA and the transfer length TL are “-”, meaning that no information thereof are stored.

(b2) JCB of the division destination MP (MP #2): The JOB status is set to “run” and in executed status, wherein the I/O access area is set in the entries of the start LBA and the transfer length TL.

(c) JCB executing an extend-over processing to the former half and the latter half sections: The division source MP # and the division destination MP # differ.

(c1) Division source MP (MP #0): The JOB status is set to “run” and in executed status, and an I/O access area is set to the entries of the start LBA and the transfer length TL. Further, the division destination JOB status is set to “run”, meaning that the division destination MP (MP #2) is in executed status.

(c2) The division destination MP (MP #2): The JOB status is set to “run” and in executed status, and the I/O access area is set in the entries of the start LBA and the transfer length TL.

<I/O Access Start Position Per Division Pattern and Transfer Length>

FIG. 16 is a fame format illustrating a relationship between the I/O division position via the extend-over I/O access and the transfer length. In the I/O access extending over the boundary, the start LBA and the transfer length TL of the I/O access must be changed per MP. Therefore, as shown in the drawing, the start LBA and the transfer length TL must be changed per MP, and each are set as a new I/O access.

The start LBA of the former half I/O is the start LBA (source LBA) of the I/O access itself, and the transfer length TL1 is a value having subtracted the source LBA from the boundary LBA. Further, the start LBA of the latter half I/O is a boundary LBA, and the transfer length TL2 is a value having subtracted the transfer length TL1 from the transfer length TL (source TL) of the I/O access.

<JOB Start Processing>

Figure 17:
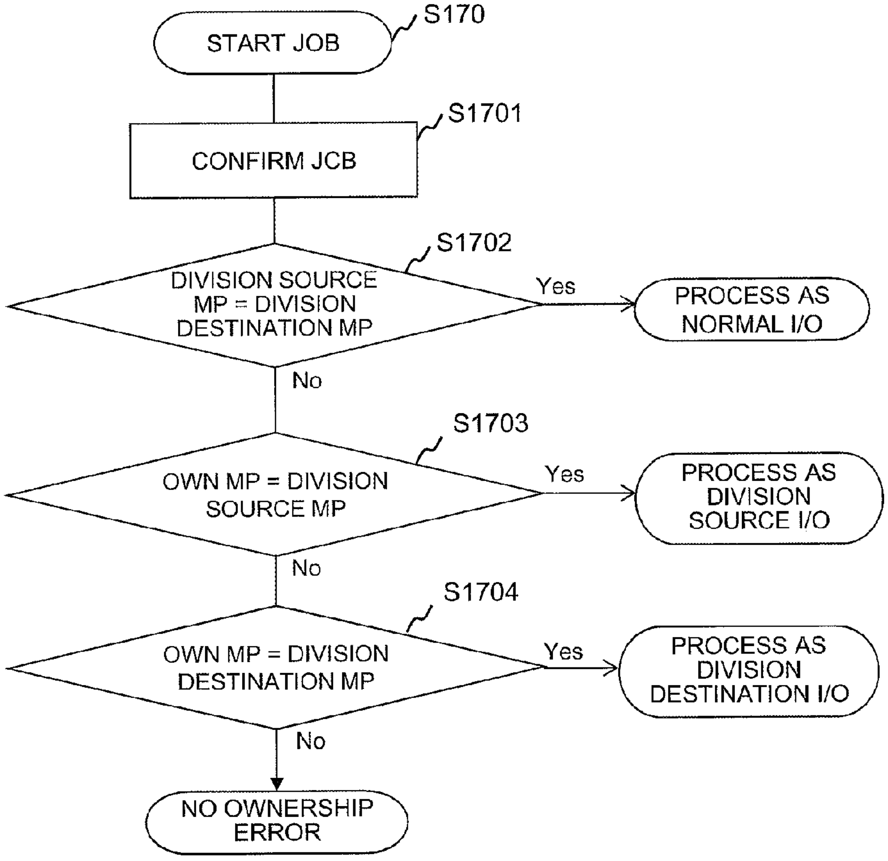
FIG. 17 is a flowchart illustrating an operation for selecting an MP having ownership.

FIG. 17 is a flowchart illustrating an operation for selecting an MP having the ownership. The present processing is a processing performed to determine the MP (division source or division destination) that the MP having started the JOB should behave as. Since multiple MPs operate simultaneously via a single device control program within the storage subsystem 2, it is necessary to recognize that the access to a single LDEV is processed by multiple MPs. The present processing S170 is started when the storage subsystem 2 receives the I/O request from the host 3 and the JOB is started. The command receiving MP is set as the MP 201.

In S1701, the MP 201 confirms the JCB 61 of the control information 2 203 stored in the LM 202. In S1702, the MP 201 compares the division source MP number and the division destination MP number of JCB 61, and if they are the same (Yes), it is determined that the division source MP and the division destination MP are the same, and the I/O is processed as a normal I/O. If they are different (No), the MP 201 executes S1703.

In S1703, the MP 201 determines whether the MP itself is a division source MP or not. The MP 201 compares the MP number of itself (MP #0) and the division source MP number, and if they are the same, the I/O is processed as a division source I/O. If they differ (No), the MP 201 executes S1704.

S1704, the MP 201 determines whether the MP 201 itself is a division destination MP or not. The MP 201 compares the MP number of itself (MP #0) and the division destination MP number, and if they are the same, it processes the I/O as the division destination I/O. If they differ (No), the MP 201 determines that the MP itself does not have ownership and that the process is an error, and ends the process.

<I/O Processing of Extend-Over/Latter Half MP>

Figure 18:
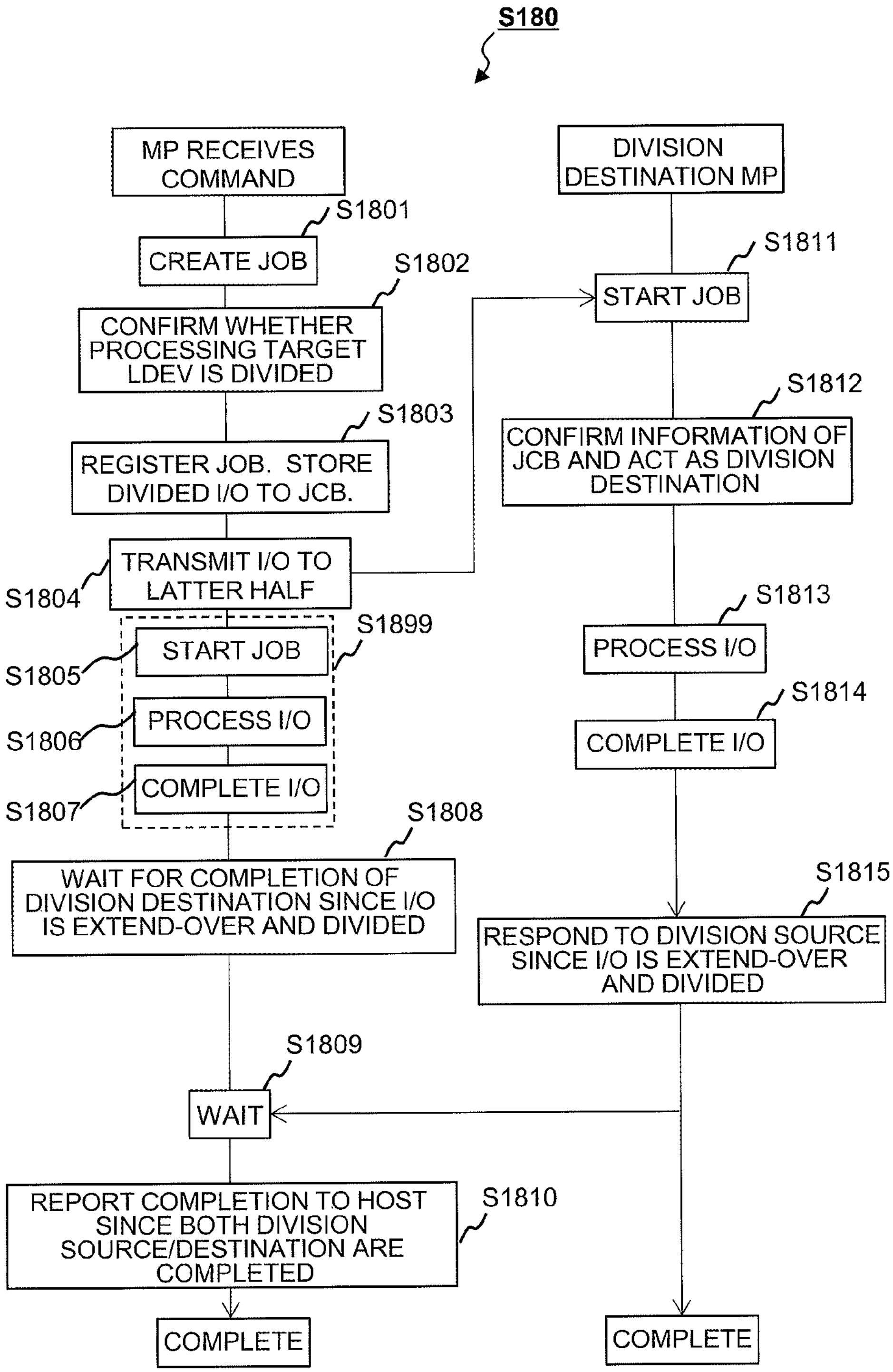
FIG. 18 is a flowchart illustrating an operation of I/O processing sequence based on I/O access position.

FIG. 18 is a flowchart illustrating an operation of an I/O processing sequence according to the I/O access position. The process S180 illustrates the I/O processing in the extend-over I/O and the latter half MP (division destination MP). The present processing describes only the differences since it is similar to FIG. 10.

In the case of an extend-over I/O, the MP (division source MP) having received the command from the LR 244 performs the processes of S1801 to S1810, and the division destination MP performs the processes of S1811 to S1815. Further, in the case of I/O processing performed only via the latter half MP (division destination MP), the processes performed in the division source MP (the processes from S1805 to S1807 shown in S1899) will not be performed. This is because I/O processing of the former section of the LDEV is unnecessary, so that the processing thereof is omitted to improve the processing performance and the access performance.

As described, according to the first embodiment, the additional process in the LR 244 is only the assigning of the I/O command to the MP compared to the other embodiments, so that the load in the LR 244 can be reduced. Moreover, since most of the processing can be executed by the MP having higher performance and higher function than the LR 244, complex processing can be executed and the processing performance can be enhanced.

Embodiment 2

Assignment of MP Processing

Figure 19:
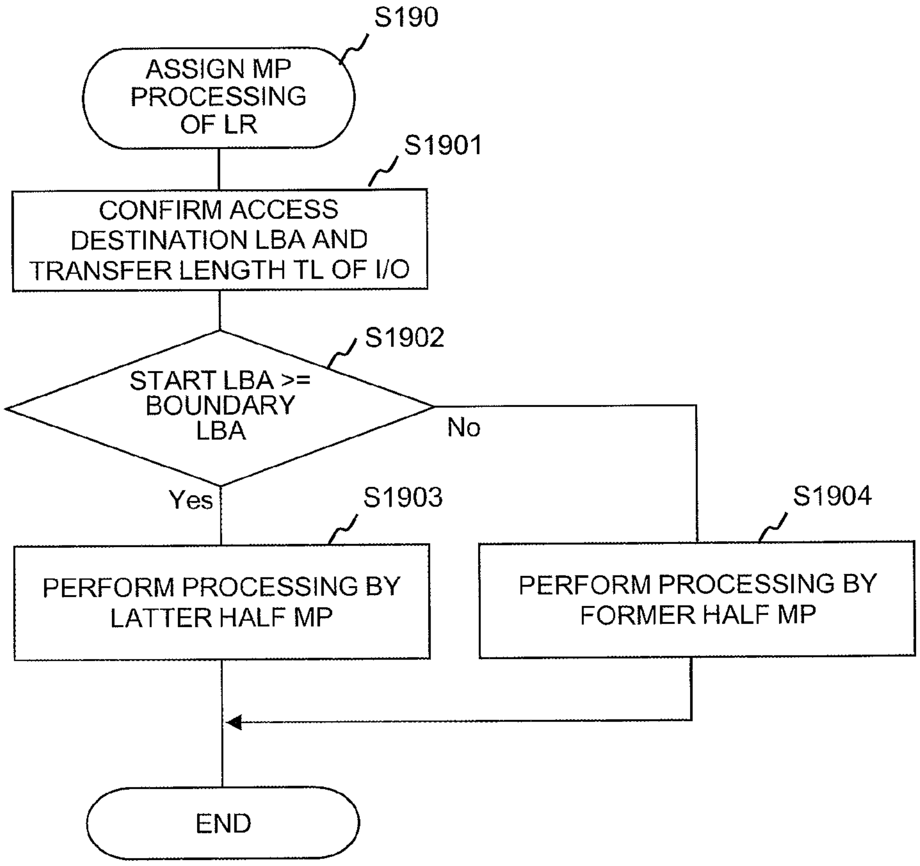
FIG. 19 is a flowchart illustrating an operation for assigning MP processing in LR according to a second embodiment.

FIG. 19 is a flowchart illustrating an operation of assignment of MP processing in the LR according to a second embodiment of the present invention. In the second embodiment, the LR 244 assigns the I/O to the owner MPPK of the former half LDEV and to the owner MPPK of the latter half LDEV, wherein the MP of the owner MPPK of the former half LDEV performs (b1) I/O processing of the former half LDEV and (b2) processing of the former/latter half extend-over I/O processing, and the owner MPPK of the latter half LDEV executes (b3) the I/O processing of the latter half LDEV. In the present processing, the LR 244 executes the MP assignment, so that the information of the ownership management table 50 becomes necessary. Therefore, the MP search table 70 in the memory 242 of the CHA_PK 24 is expanded to create a similar table as the ownership management table 50. In the following description, the MP search table 70 is set as the ownership management table 50. The former half MP is the MP 201 and the latter half MP is the MP 221.

When an I/O request is received from the host 3, the LR 244 confirms the command type. If the command type is a read or a write command, the LR 244 refers to the ownership management table 50 in S1901, and determines whether processing should be executed as a normal I/O or a division I/O. If it should be processed as a division I/O, the I/O command is assigned to the MPPK having ownership. At this time, the LR 244 acquires the start LBA and the transfer length TL within the I/O command (S1901).

In S1902, the LR 244 determines whether the start LBA is equal to or greater than the boundary LBA or not. If it is equal to or greater (Yes), the LR 244 executes S1903, and if not (No), it executes S1904. In S1903, the LR 244 sends the I/O request to the MP 221 to have the I/O processed by the latter half MP. The MP 221 executes the I/O access processing in the address area from the received start LBA to the transfer length TL. In S1904, the LR 244 sends the I/O request to the MP 201 to have the request processed via the former half MP. The MP 201 executes the I/O access processing in the address area from the start LBA to the transfer length TL. At this time, the MP 201 executes the I/O access processing without considering whether the area extends over divided sections.

According to the second embodiment, the processes added to the LR 244 compared to other embodiments are only the reference to the table and the assigning of the I/O command to the MP, so that the load in the LR can be reduced. Further, since the transferring of commands to the division destination MP in the command-receiving MP and the confirmation of the job status among MPs become unnecessary, so that the load of the MP can also be reduced. In addition, since the process of adding information to the JCB 61 becomes unnecessary, the load of the LR 244 and the MP can be further reduced.

Embodiment 3

Assignment of MP Processing

Figure 20:
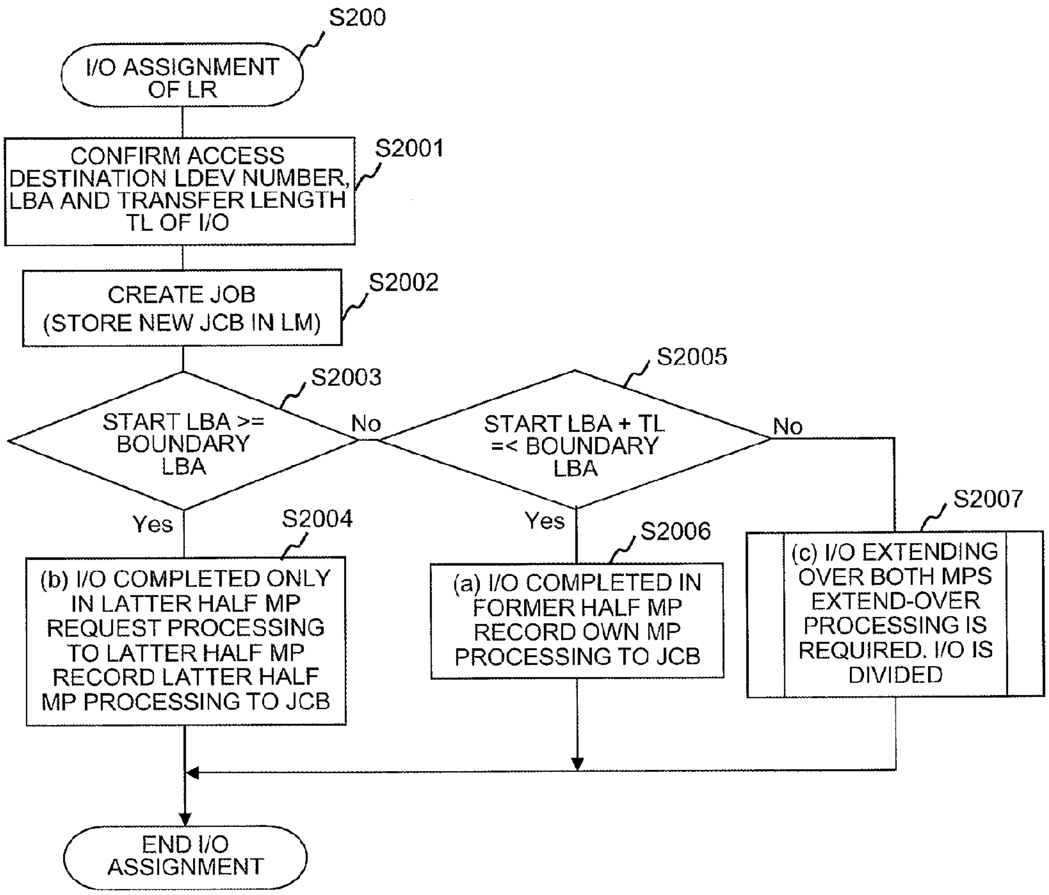
FIG. 20 is a flowchart illustrating an operation for assigning an I/O in LR according to a third embodiment.

FIG. 20 is a flowchart illustrating an operation of I/O assignment in the LR according to the third embodiment.

In the third embodiment, the LR 244 assigns the I/O to the owner MPPK of the former half LDEV and to the owner MPPK of the latter half LDEV. Further, the LR 244 also divides the extend-over I/O and assigns the respective division I/Os to the MP in charge of processing the same. The I/O processing in each MP is the same as the first embodiment. Further, in process S200, since the LR 244 performs MP assignment, the information of the ownership management table 50 becomes necessary, similar to the second embodiment. Further, MP 201 is set as the former half MP, and MP 221 is set as the latter half MP.

In S2001, the LR 244 confirms via the ownership management table 50 the LDEV number of the I/O access destination, the start LBA and the transfer length TL. In S2002, the LR 244 creates a JOB, and a new JCB 61 is stored in the LM 202 that the MP 201 accesses and the LM 222 that the MP 221 accesses. In S2003, the LR 244 determines whether the start LBA is equal to or greater than the boundary LBA or not. If it is equal to or greater than the boundary LBA (Yes), the LR 244 executes S2004, and if smaller, it executes S2005. In S2005, the LR 244 determines whether the result having added the transfer length TL to the start LBA (I/O access end LBA) is equal to or smaller than the boundary LBA or not. If it is equal to or smaller than the boundary LBA (Yes), the LR 244 executes S2006, and if not, the LR executes S2007.

In S2004, the LR 244 determines that the I/O is (b) I/O that is completed only in the latter half MP, and stores the processing request to the latter half MP (MP 221) and the latter half MP processing information in the JCB 61 used in JOB execution of the latter half MP (MP 221). In S2006, the LR 244 determines that the I/O is (a) I/O that is completed in the former half MP (MP 201), and stores the former half MP processing information in the JCB 61. In S2007, the LR 244 executes (c) I/O extend-over processing (I/O division) extending over both MPs. This process divides the I/O, as shown in FIG. 16.

<I/O Processing>

Figure 21:
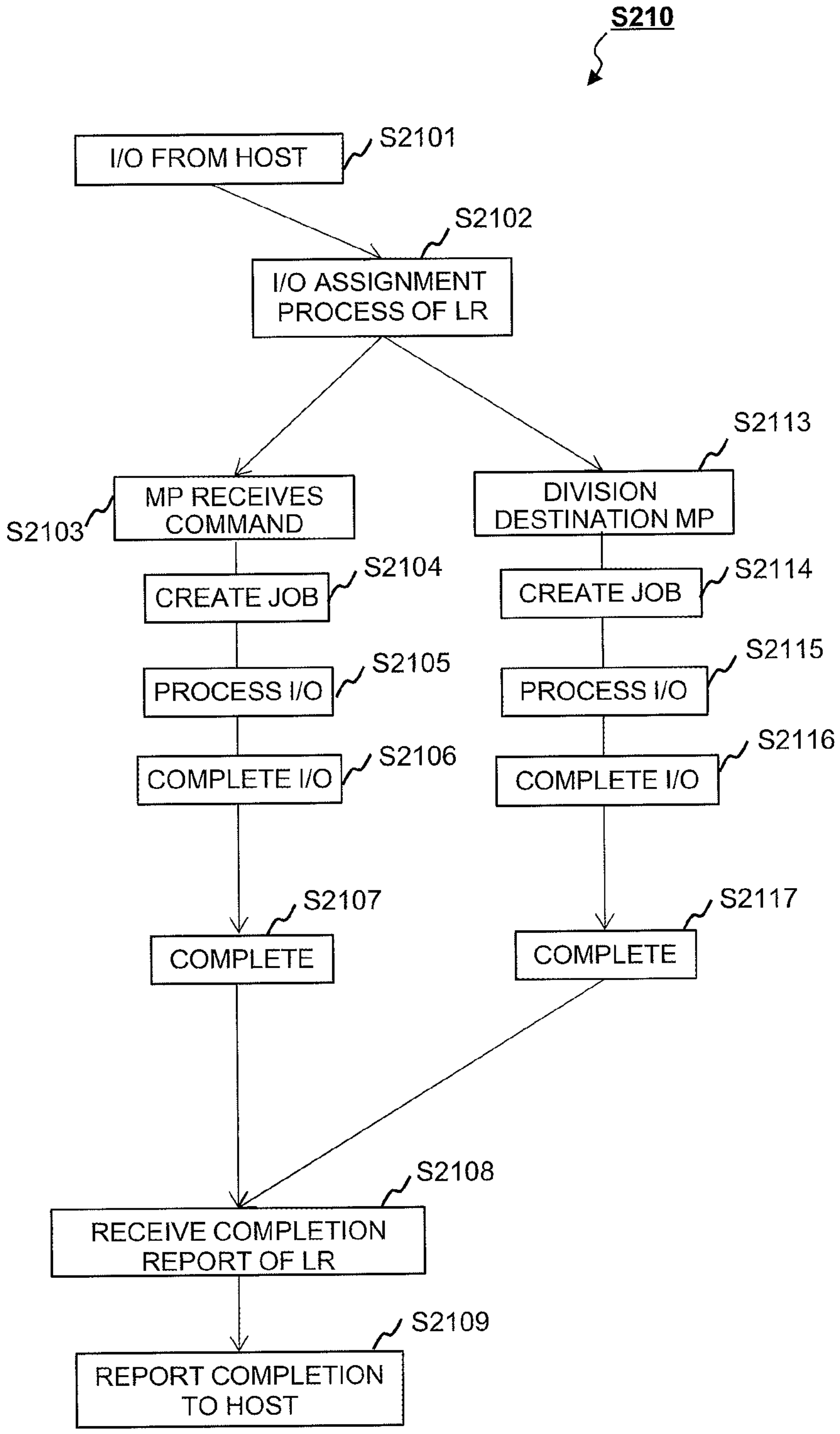
FIG. 21 is a flowchart illustrating an I/O processing according to a third embodiment.

FIG. 21 is a flowchart illustrating an I/O processing according to a third embodiment. The present I/O processing S210 is started when an I/O request is received from the host 3. The embodiment is illustrated assuming that the command-receiving MP is the MP 201 and the division destination MP is the MP 221.

In S2101, the LR 244 receives an I/O request from the host 3. In S2102, the I/O assignment processing in the LR 244 is performed. The LR 244 determines whether division is necessary or not in the ownership management table 50, as mentioned earlier, wherein if division is not necessary, the MP is caused to execute a normal I/O, and if division is necessary, each MP is caused to execute respective division I/O processing. Further, in the division I/O processing, the start LBA and the transfer length TL of the I/O command is compared with the boundary LBA of the ownership management table 50, and the MP in charge of the I/O processing is determined. Thereafter, the divided I/O command is transmitted to each MP.

In S2103, the MP 201 receives a divided I/O command from the LR 244. In S2104, the MP 201 creates a JOB from the JCB 61 registered to the LM 202. In S2105, the MP 201 executes I/O processing by the created JOB. In S2106, the MP 201 deletes the JCB 61 and ends the JOB when the I/O processing is completed, and in S2107, a JOB completion report is notified to the LR 244.

The processes from S2113 to S2117 are the same as the processes from S2103 to S2107 with the MP 201 replaced with the MP 221. In S2108, when the LR 244 receives a JOB completion report from both the MP 201 (command reception MP (division source MP)) and the MP 221 (division destination MP), it transmits an I/O completion report to the host 3 via the host I/F 241 in S2109.

Compared to other embodiments, in the third embodiment, assignment processing of all the I/Os is executed in the LR 244. Therefore, the MP-side devices can focus on processing I/O accesses to the storage drive 271, by which the access performance can be improved. Moreover, since the transmission and reception of commands among MPs and the confirmation of job status among MPs become unnecessary, the MP occupation by the accesses to the storage drive can be improved, according to which the I/O access time can be shortened. In addition, since the I/O assignment processing in the LR 244 and the I/O access processing in the MP can be parallelized, high-speed I/O processing becomes possible even if multiple I/O requests occur. Based on the effect of the above components, the access performance of the storage subsystem 2 can be improved.

When the LDEV is always divided equally, as described in embodiments 1 through 3, it is assumed that the overhead of I/O processing extending over the former half and the latter half is possibly increased and the access performance is deteriorated. Therefore, according to the fourth embodiment, the storage subsystem 2 stores the history of the I/O access range, determines the address of division where the I/O extending over the former and latter half sections is minimized, and dynamically changes the dividing address. Thereby, the deterioration of performance accompanying the extend-over I/O processing can be reduced.

<Table for Managing Number of I/Os>

FIG. 22 is a view illustrating a configuration example of a table for managing the number of I/Os according to the fourth and fifth embodiments. A table for the managing number of I/Os 220 is a table for managing a total number of I/Os and a number of extend-over I/Os in units smaller than volume units. In the present embodiment, the unit is set to page units of virtual VOLs (such as 10 MB/page), which is a unit smaller than volumes. The table for managing the number of I/Os 220 is a virtual VOL_ID 2201 for uniquely identifying virtual VOLs, a virtual page ID 2202 for uniquely identifying the virtual pages in the virtual VOLs, a total number of I/Os 2203 showing the total number of I/Os that has occurred in each virtual page, and a number of extend-over I/Os 2204 showing the number of I/O accesses extending over virtual pages.

Next, we will describe the process for counting the number of I/Os. Every time an I/O request is received from the host, a virtual volume control program (FIG. 25) executed by the MP of the storage subsystem 2 refers to a mapping management table (FIG. 26), and specifies the virtual VOL and the virtual page ID being the target of the I/O. Next, the virtual volume control program increments the total number of I/Os of the records in the table for managing the number of I/Os 220 corresponding to the virtual VOL and the virtual page being the I/O target. Further, when the range of the I/O extends over virtual pages, the virtual volume control program increments the number of extend-over I/Os of the leading virtual page.

Embodiment 4

An LDEV division change processing according to the fourth embodiment is executed by an ownership control program (FIG. 25) executed by the MP of the storage subsystem 2 either periodically or when an instruction is received from the system administrator. The ownership control program refers to the table for managing the number of I/Os, and determines the termination virtual page of the former half section so that the total number of I/Os of the former half and the latter half of the virtual VOL are as even as possible and that the number of the extend-over I/Os is as small as possible. The actual example will be described below.

According to case 1, the virtual pages 1 to 3 are set as the former half, and the virtual pages 4 to 6 are set as the latter half. In case 1, the total number of I/Os of the former half is 160, the total number of I/Os of the latter half is 140, and the number of extend-over I/Os is 1 in the termination virtual page 3 of the former half section. Further, according to case 2, the virtual pages 1 to 4 are set as the former half, and the virtual pages 5 and 6 are set as the latter half section. In case 2, the total number of I/Os of the former half is 180, the total number of I/Os of the latter half is 120, and the number of extend-over I/Os is 1 in the termination virtual page 4 of the former half section.

In dividing the area into two, as in cases 1 and 2, the boundary of pages allocated to processing by the respective MPs is set so that the total number of I/Os are as even as possible in the former half and the latter half of the virtual VOL, and that the number of the extend-over I/Os is as small as possible. Thereby, the load applied to the respective MPs can be flattened, and the deterioration of access performance can be prevented.

Next, we will describe a case 3 where the area is divided into three sections. Virtual page 1 is set as a first area, virtual pages 2 to 4 are set as a second area, and virtual pages 5 to 6 are set as a third area. In case 3, the total number of I/Os of the first area is 100, the total number of I/Os of the second area is 80, and the total number of I/Os of the third area is 120, so that the number of extend-over I/Os is 1 in the terminal virtual page 1 in the first area, and 1 in the termination virtual page 4 of the second area. There is a dispersion in the total number of I/Os of each area, but since there is only one extend-over I/O, the processing of the extend-over I/O can be reduced. Similar to cases 1 and 2, case 3 enables to flatten the load of each MP and prevent deterioration of access performance. The fourth embodiment of the present invention can be applied to embodiments 1 through 3 mentioned earlier. By combining the embodiments, the I/O access performance can be enhanced even further.

Embodiment 5

In embodiment 5, the storage subsystem 2 measures the access performance (such as response performance and throughput) to the LDEV, determines whether the LDEV should be divided or not, and when dividing the same, determines the division number and where it should be divided, and dynamically changes the division of LDEVs. By the storage subsystem 2 measuring the I/O access processing time to the LDEV, the I/O assignment processing time and the I/O assignment frequency, so as to divide the LDEV at an address where the processing time of the extend-over I/Os is minimized and the processing time of I/O accesses of the former half and the latter half sections are substantially equivalent, the load of the former half MP and the latter half MP can be flattened and the overall I/O processing time can be shortened. The fifth embodiment of the present invention is applicable to embodiments 1 through 3 mentioned earlier. By combining the embodiments, the I/O access performance can be enhanced even further.

Embodiment 6

Concept

Figure 23:
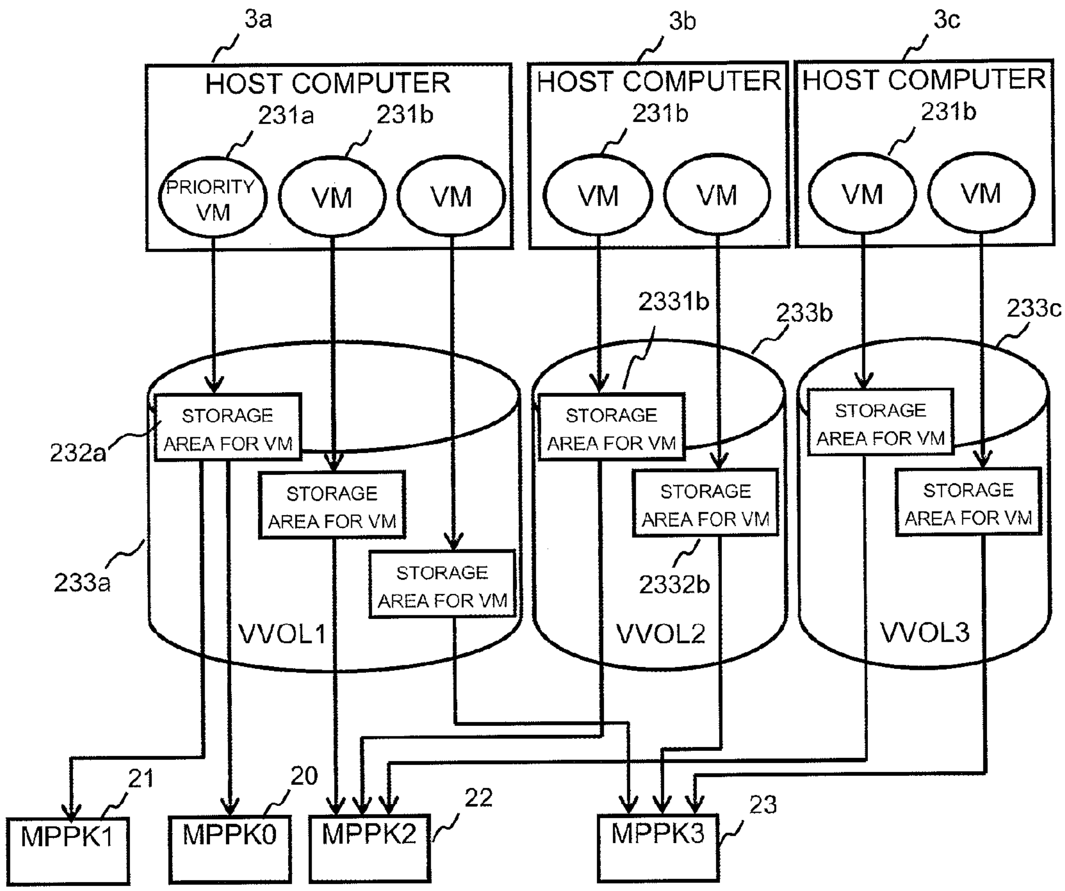
FIG. 23 is a view illustrating a concept according to a sixth embodiment.

FIG. 23 is a view illustrating a concept of the sixth embodiment of the present invention. When multiple virtual machines (VMs) 231 are operated in the hosts 3 (3*a* to 3*c*), a VM control program (FIG. 24) operating in the MP of hosts 3 can mount multiple virtual volumes VVOL 233 created in the storage subsystem 2, create a storage area for VMs (normally a file) 232 in the virtual volumes VVOL 233, and allocate the storage area 232 for VMs to the VM 231. The VM 231 is handled as if the volume has the storage area for VMs 232 mounted thereto.

In such VM environment, multiple VMs share a single virtual volume (VVOL), and since the I/O to the virtual volume is processed by a single MPPK, it is not possible to correspond to cases where the I/O to a certain VM is to be processed with priority or where a response performance of I/O of a certain VM is to be improved. In order to solve this problem, according to the sixth embodiment of the present invention, the processing of I/Os to a storage area for the VM having a high priority is to be executed via an MPPK that differs from the MPPK having ownership of the volume including that storage area. Further, the I/O of the storage area for the VM having a high priority can be processed via two or more MPPKs. Thereby, the I/O processing of VM 231*a* having a high priority can be executed with priority, and the response performance can be improved.

In addition, the group of storage areas for VMs (such as storage areas 2331*b* and 2232*b* for VMs of VVOL2 233*b*) sharing and using a single virtual volume can be divided into two or more parts, and the I/Os thereof are processed via different MPPKs. Thereby, the processing of the I/O from a normal VM 231*b* can be divided and processed in parallel, so that the response performance can be improved.

<Overall System>

Figure 24:
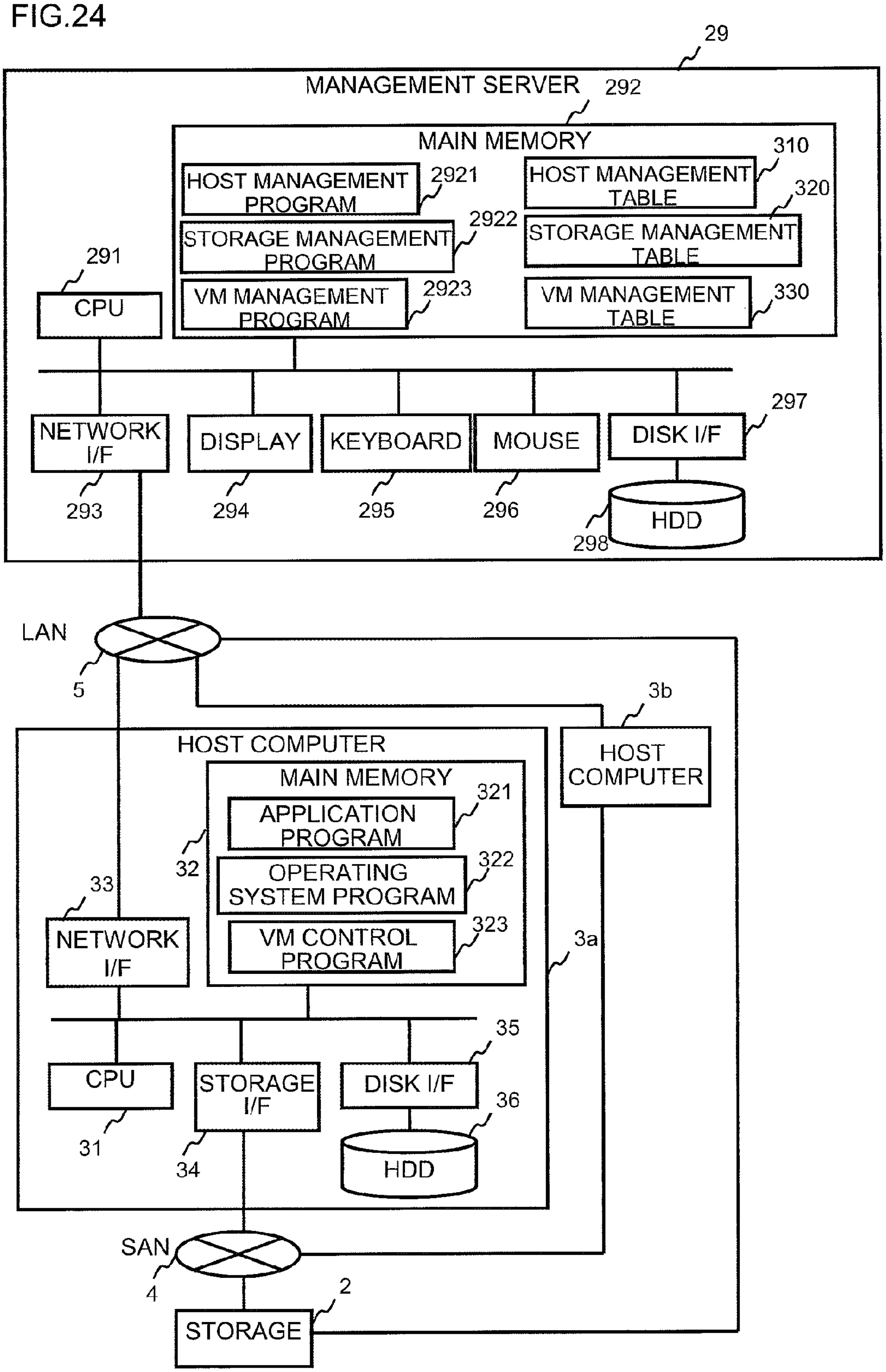
FIG. 24 is a block diagram illustrating a configuration of an overall system including a storage subsystem according to the sixth embodiment.

FIG. 24 is a block diagram illustrating a configuration of an overall system including a storage subsystem according to a sixth embodiment. The overall system includes multiple hosts 3, a storage subsystem 2 and a management server 29, which are mutually coupled via a SAN 4 or a LAN 5.

The management server 29 comprises a CPU 291 for controlling the whole server, a main memory 292 for storing various programs and tables, a network I/F 293 for coupling with a LAN 5, a display 294, a keyboard 295, a mouse 296, and a disk I/F 297 controlling transmission and reception of data with multiple HDDs 298. Further, the main memory 292 stores a host management program 2921 and a host management table 310 for managing and controlling the hosts 3, a storage management program 2922 and a storage management table 320 for managing and controlling the storage subsystem 2, and a VM management program 2923 and a VM management table 330 for managing and controlling the VM 231.

The host 3 has a CPU 31 for controlling the whole device, a main memory 32 for storing various programs and tables, a network I/F 33 for coupling with the LAN 5, a storage I/F 34 for coupling with the SAN 4, and a disk I/F 35 for coupling with multiple HDDs 36. The main memory 32 stores an operating program 322 for operating an application program 321 such as a business program, and a VM control program 323 for managing and controlling the VM.

<LM Configuration>

Figure 25:
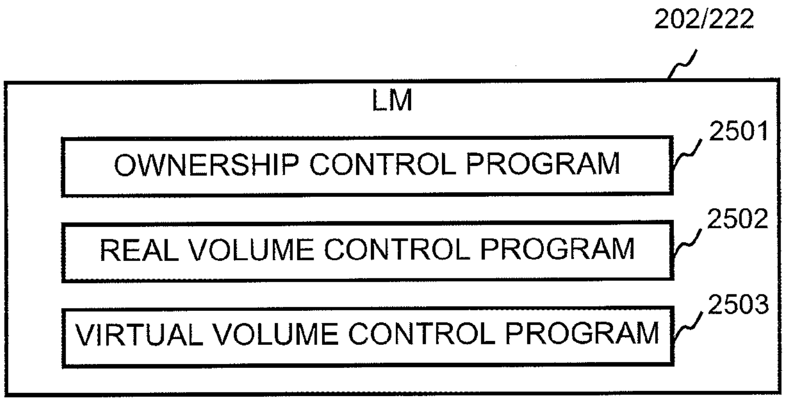
FIG. 25 is a view illustrating a configuration example of a control program stored in an LM.

FIG. 25 is a view illustrating a configuration example of a control program stored in the LM. The LM 202/222 of the storage subsystem 2 stores an ownership control program 2501 for managing and controlling an owner MPPK processing accesses to the storage area for VMs 232, a real volume control program 2502 for managing and controlling the storage capacity of the like of a real volume, and a virtual volume control program 2503 for managing and controlling the allocation of storage areas to virtual volumes.

<SM Configuration>

Figure 26:
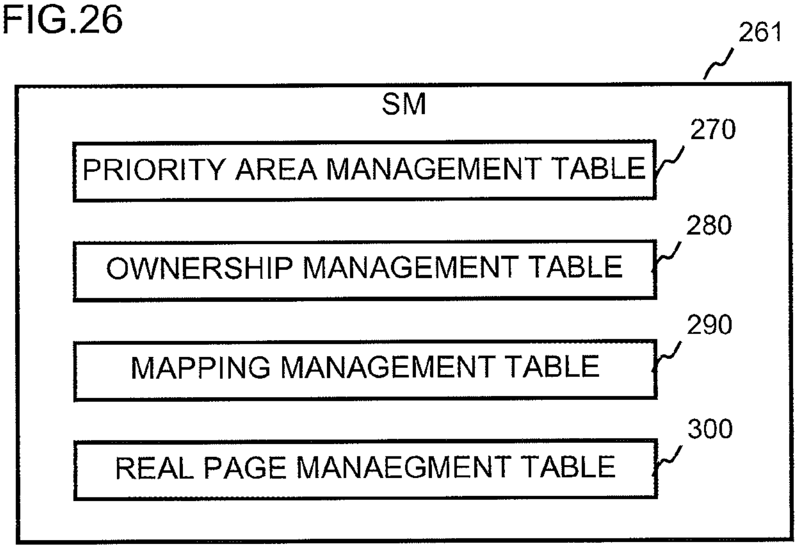
FIG. 26 is a view illustrating a configuration example of a control table stored in an SM.

FIG. 26 is a view showing a configuration example of a control table stored in the SM. An SM 261 of the storage subsystem 2 stores a priority area management table 270 for managing which area of the virtual VOL 233 an MPPK should be allocated with priority, an ownership management table 280 for managing the MPPK allocated to each virtual VOL 233, a mapping management table 290 for managing the correspondence between virtual pages and real pages, and a real page management table 300 for managing the allocation status of the real volumes and real pages.

<Priority Area Management Table>

FIG. 27 is a view illustrating a configuration example of a priority area management table in the storage subsystem. The priority area management table 270 includes entries of a virtual VOL_ID 2701 for uniquely identifying virtual VOLs, a start virtual page ID 2702 and an end virtual page ID 2703 for identifying a priority area range, and an owner MPPK 2704 in charge of processing I/O in the priority area range.

<Ownership Management Table>

FIG. 28 is a view illustrating a configuration example of an ownership management table according to the storage subsystem. The ownership management table 280 includes entries of a virtual VOL_ID 2701 and an owner MPPK 2802 in charge of processing I/O in the respective virtual VOLs.

<Mapping Management Table>

FIG. 29 is a view illustrating a configuration example of a mapping management table in the storage subsystem. The mapping management table 290 includes entries of a virtual VOL_ID 2701, a virtual page ID 2902 for uniquely identifying the virtual pages of each virtual VOL, a real VOL ID 2903 for uniquely identifying the real volumes allocated to the virtual pages, and a real page ID 2904 for uniquely identifying the real pages per real volume.

<Real Page Management Table>

FIG. 30 is a view illustrating a configuration example of a real page management table in the storage subsystem. The real page management table 300 includes entries of a real VOL_ID 2903 for uniquely identifying real VOLs, a real page ID 2904 for uniquely identifying the real pages, and an allocation flag 3003 indicating the status of allocation of the real pages.

This table is referred to by the following processes.

(1) Mapping Process (Virtual Volume Control Program)

The MP of the storage subsystem 2 refers to the mapping management table 290 based on the virtual volume control program 2503, and converts the virtual VOL and the virtual page to which I/O is requested from the host 3 to a real VOL and a real page. If the real VOL_ID and the real page are "NULL", zero data will be returned via the CHA_PK 24 to the host 3 if the I/O type is read. If the I/O type is write, a new page allocation processing of the virtual volume control program 2503 is executed. Thereafter, I/O processing based on the real volume control program 2502 is executed.

(2) New Page Allocation Processing (Virtual Volume Control Program)

The MP of the storage subsystem 2 refers to the real page management table 290 and searches an unallocated real page based on the virtual volume control program 2503. The allocation flag of the record corresponding to the extracted unallocated real page is changed to allocated. The virtual volume control program 2503 changes the records of the real VOL_ID 2903 and the real page ID 2904 of the mapping management table 290 to IDs of the allocated real VOLs and real pages, respectively.

<Host Management Table>

FIG. 31 is a view illustrating a configuration example of a host management table in a management server. The host management table 310 includes entries of a host ID 3101 for uniquely identifying a host, and an IP address 3102 corresponding thereto.

<Storage Management Table>

FIG. 32 is a configuration example of a storage management table in a management server. The storage management table 320 includes entries of a storage ID 3201 for uniquely identifying the storage subsystem 2, and an IP address 3202 corresponding thereto.

<VM Management Table>

FIG. 33 is a view illustrating a configuration example of a VM management table in the management server. A VM management table 330 includes entries of a host ID 3101, a VM_ID 3302 for uniquely identifying the VMs, a storage ID 3201, a virtual VOL_ID 2701, a storage area start address 3305 and a storage area end address 3306 for specifying a range of a storage area allocated to the VMs, and a priority 3307 for determining whether it is a priority area or not.

<Host Setting>

Figure 34:
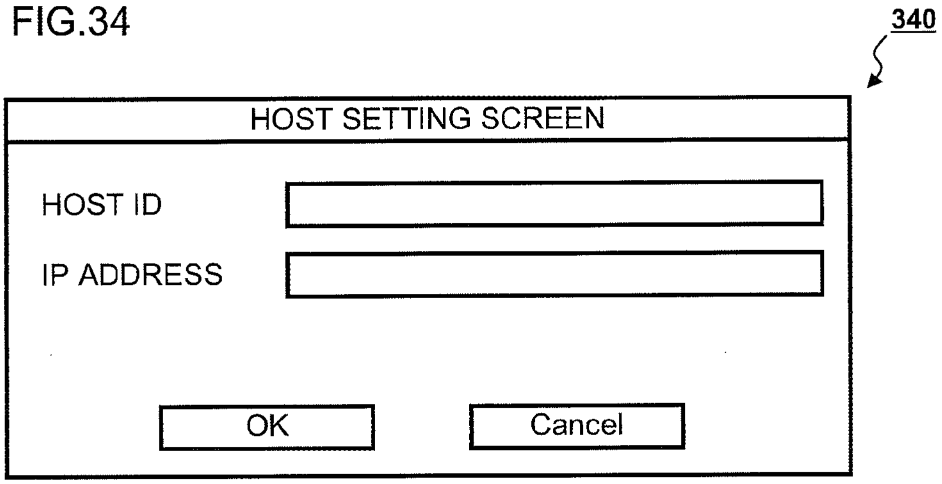
FIG. 34 is a view illustrating a configuration example in a host setting screen in a management server.

FIG. 34 is a view illustrating a configuration example of a host setting screen in a management server. A host setting screen 340 is displayed on the display 294 in the host setting process of the host management program 2921 of the management server 29. When an OK button on the host setting screen 340 is clicked, the host management program 2921 adds a record to the host management table 310 based on the data entered to the host ID area and the IP address area.

<Storage Setting>

Figure 35:
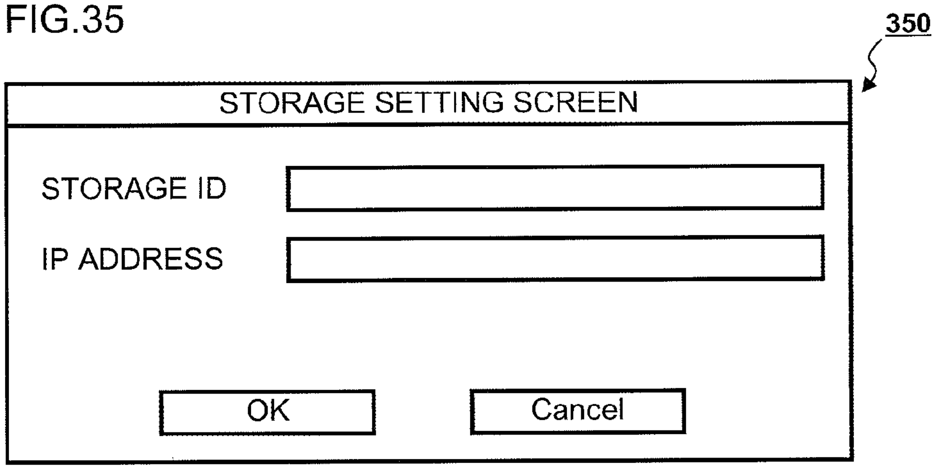
FIG. 35 is a view illustrating a configuration example in a storage setting screen in a management server.

FIG. 35 is a view illustrating a configuration example of a storage setting screen in a management server. A storage setting screen 350 is displayed on the display 294 via a storage setting process in the storage management program 2922 of the management server 29. When an OK button of the storage setting screen 350 is clicked, the storage management program 2922 adds a record to the storage management table 320 based on the data entered to the storage ID area and the IP address area.

<Real VOL Setting>

Figure 36:
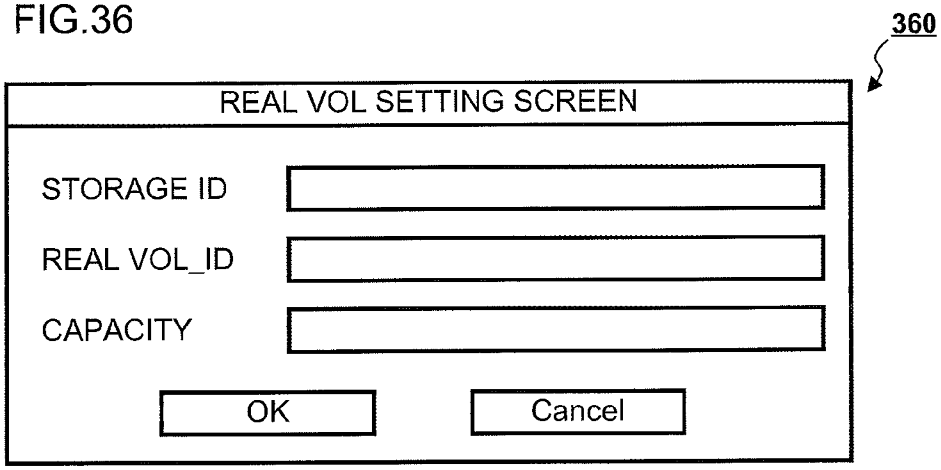
FIG. 36 is a view illustrating a configuration example of a real VOL setting screen in a management server.

FIG. 36 is a view illustrating a configuration example of a real VOL setting screen in the management server. A real VOL setting screen 360 is displayed on the display 294 in a real VOL setting process of the storage management program 2922 of the management server 29. When an OK button on the real VOL setting screen is clicked, the storage management program 2922 specifies via the storage management table 320 the IP address of the storage subsystem 2 having the ID entered in the storage ID area. Then, the storage management program 2922 transmits a real VOL creation request having an ID entered in the real VOL_ID area and a capacity entered in the capacity area to the specified IP address.

When the storage subsystem 2 receives the request, the real volume control program 2502 of the storage subsystem 2 adds a record to the real page management table 300. The real page ID is assigned sequentially starting from number 1. The allocation flag 3003 is set to "unallocated". The number of records is a value obtained by dividing the capacity of the real VOL by the page size. When the adding of a record succeeds, a normal end response is transmitted to the management server 29. When the management server 29 receives a normal end response, the storage management program 2922 ends the process.

<Virtual VOL Setting>

Figure 37:
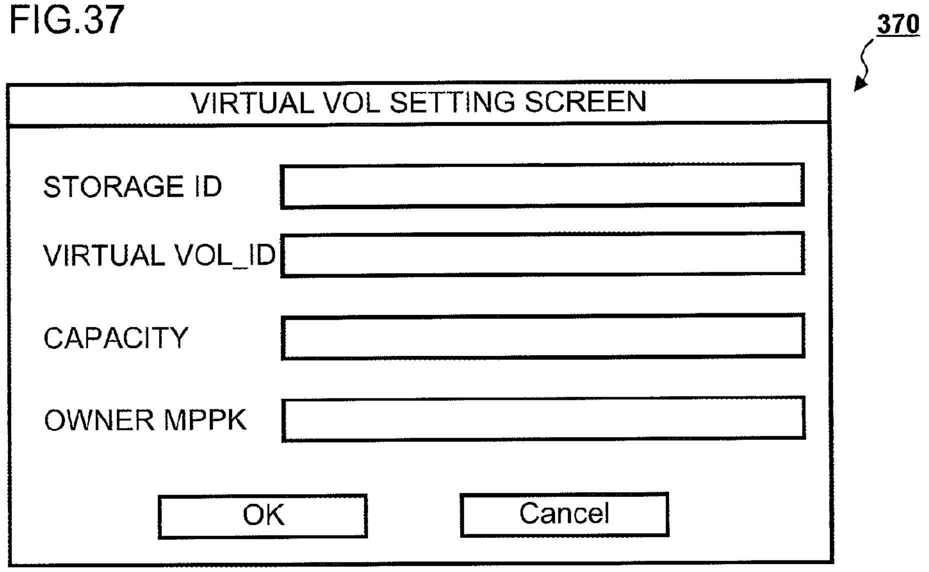
FIG. 37 is a view illustrating a configuration example of a virtual VOL setting screen in a management server.

FIG. 37 is a view illustrating a configuration example of a virtual VOL setting screen in the management server. A virtual VOL setting screen 370 is displayed on a display 294 via a virtual VOL setting process of the storage management program 2922 of the management server 29. When an OK button on the virtual VOL setting screen 370 is clicked, the storage management program 2922 specifies the IP address of the storage subsystem 2 having an ID entered in the storage ID area via the storage management table 320.

The storage management program 2922 has an ID entered to a virtual VOL_ID area and a capacity entered in the capacity area to the specified IP address, and transmits a request to create a virtual VOL to which the MPPK having the ID entered in the owner MPPK area has ownership. When the storage subsystem 2 receives a virtual VOL creation request, the virtual volume control program 2503 adds a record to the mapping management table 290. The virtual page ID 2902 is assigned sequentially starting from number 1. The real VOL_ID 2903 and the real page ID 2904 are set to "NULL". The number of records is the value having divided the capacity of the virtual VOL by the page size.

Next, the ownership control program 2501 adds a record to the ownership management table 280. The virtual VOL_ID 2701 of the record stores the ID entered to the virtual VOL_ID area, and the owner MPPK 2704 stores the ID entered to the owner MPPK area. Thereafter, the storage subsystem 2 transmits a normal end response to the management server 29. When the management server 29 receives a normal end response, the storage management program 2922 ends the process.

<VM Setting>

Figure 38:
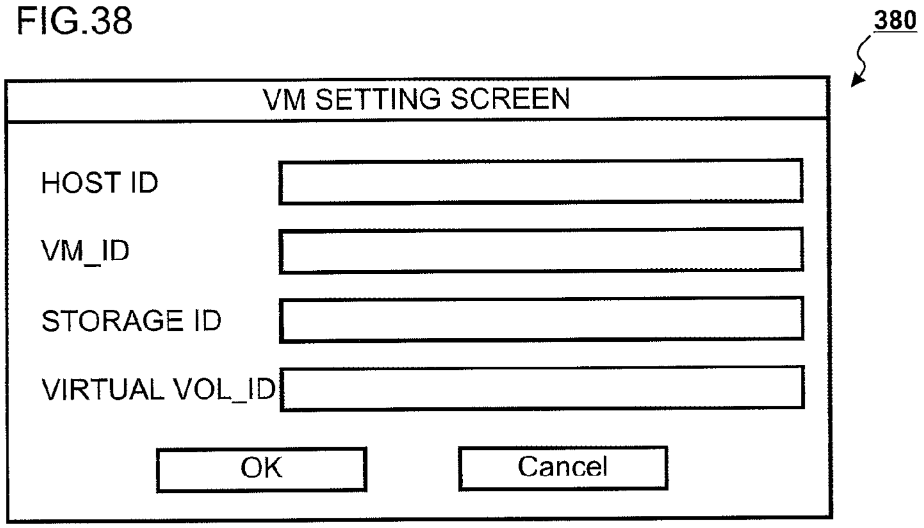
FIG. 38 is a view illustrating a configuration example of a VM setting screen in a management server.

FIG. 38 is a view illustrating a configuration example of a VM setting screen in the management server. A VM setting screen 380 is displayed on the display 294 via a VM setting process of the VM management program 2923 in the management server 29. When an OK button on the VM setting screen 380 is clicked, the VM management program 2923 specifies the IP address of the host having the ID entered in the host ID area by referring to the host management table 310.

The VM management program 2923 transmits a VM create request to the specified IP address. The VM has an ID entered in the VM ID area, and has a given storage area in the virtual VOL having an ID entered in the virtual VOL_ID area of the storage subsystem 2 having an ID entered in the storage ID area.

When the host 3 receives a VM create request, the VM control program 323 creates a storage area (for example, a file having a predetermined capacity) in a virtual VOL having the ID entered in the virtual VOL_ID area of the storage subsystem 2 having the ID entered in the storage ID area. Then, the host 3 transmits a normal end response to the management server 29. The normal end response includes a start address and an end address of the created storage area. It is also possible to adjust the capacity of the storage area so that the page partition and the start address/end address of the storage area correspond.

When the management server 29 receives a normal end response, the VM management program 2923 adds a record to the VM management table 330. In the records, the host ID 3101 stores an ID entered in the host ID area, a VM_ID 3302 stores an ID entered in the VM_ID area, a storage ID 3201 stores an ID entered in a storage ID area, a virtual VOL_ID 2701 stores an ID entered in a virtual VOL_ID area, a storage area start address 3305 and a storage area end address 3306 store the start address and the end address included in the response from the host 3, and a priority 3307 stores "non-priority".

<Prioritized VM Setting>

Figure 39:
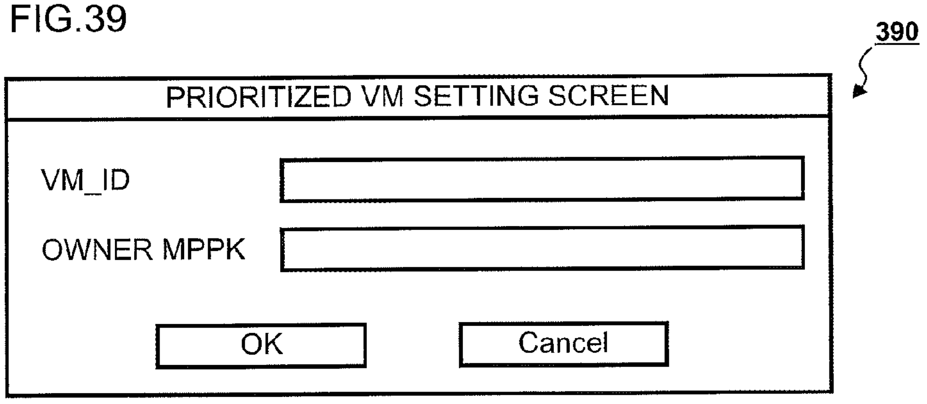
FIG. 39 is a view illustrating a configuration example of a prioritized VM setting screen in a management server.

FIG. 39 is a view illustrating a configuration example of a prioritized VM setting screen in the management server. A prioritized VM setting screen 390 is displayed on the display 294 in a prioritized VM setting process of the VM management program 2923 of the management server 29. When an OK button on the prioritized VM setting screen 390 is clicked, the VM management program 2923 specifies the record of the VM having an ID entered in the VM_ID area from the VM management table 330, and changes the priority 3307 to "prioritized".

The VM management program 2923 extracts the value of the storage ID from the record. Then, the VM management program 2923 specifies the IP address of the storage subsystem 2 having that value as ID by referring to the storage management table 320. The VM management program 2923 transmits to the specified IP address a request to designate the VM having the ID entered in the VM_ID area as the prioritized VM. The prioritized VM designation request includes an ID entered to the owner MPPK area, a virtual VOL_ID of the record of the specified VM management table 330, a storage area start address, and a storage area end address.

When the storage subsystem 2 receives a prioritized VM designation request, the ownership control program 2501 checks whether the owner MPPK included in the request already has ownership of a different virtual VOL_ID or not by referring to the ownership management table 2501. If the owner MPPK already has ownership of a different virtual VOL_ID, it returns an error response. In another example, the owner MPPK of the existing virtual VOL_ID is changed so that the owner MPPK included in the request is not set as an owner of any virtual VOL. Actually, the owner MPPK included in the request assigns the ownership of the virtual VOL of the owner MPPK included in the request evenly to other MPPKs.

The ownership control program 2501 adds a record to the priority area management table 270. In the records, the virtual VOL_ID 2701 stores the virtual VOL_ID included in the request, the start virtual page ID 2702 stores the virtual page ID computed based on the storage area start address included in the request, the end virtual page ID 2703 stores the virtual page ID computed based on the storage area end address included in the request, and the owner MPPK 2704 stores the ID entered to the owner MPPK area included in the request. The start virtual page ID 2702 and the end virtual page ID 2703 are each a quotient of the result having divided the start address and the end address by page size, wherein if it is indivisible, the value is rounded down or rounded up. The storage subsystem 2 sends a normal end response to the management server 29.

<Prioritized VM Setting Process>

Figure 40:
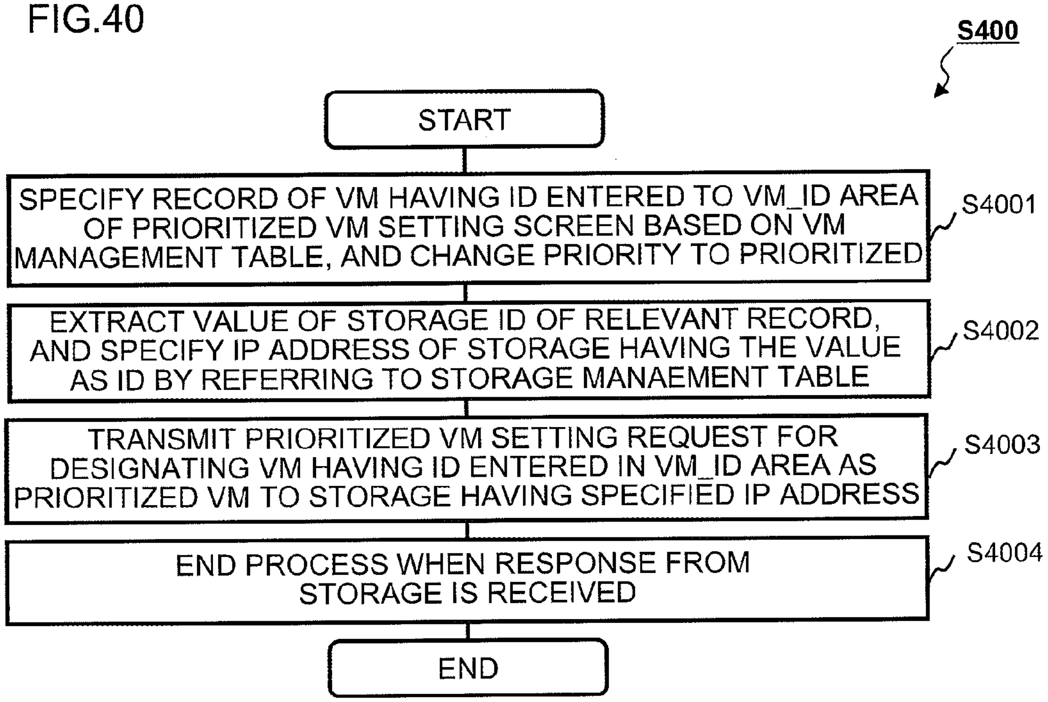
FIG. 40 is a flowchart illustrating a prioritized VM setting process in a management server.

FIG. 40 is a flowchart illustrating a prioritized VM setting process in a management server. A prioritized VM setting process S400 is a process executed by the VM management program 2923 of the management server 29 when an OK button on the prioritized VM setting screen 390 is clicked. The subject of the process is illustrated as the VM management program 2923, but it can also be the CPU 291 in which the VM management program 2923 operates.

In S4001, the VM management program 2923 specifies the record of the VM having the ID entered to the VM_ID area of the prioritized VM setting screen 390 in the VM management table 330, and changes the priority 3307 from "non-priority" to "prioritized". In S4002, the VM management program 2923 extracts the value of the storage ID of the relevant record, and specifies the IP address of the storage subsystem 2 having that value as ID by referring to the storage management table 320.

In S4003, the VM management program 2923 transmits a prioritized VM setting request for specifying the VM having the ID entered in the VM_ID area as the prioritized VM to the storage subsystem 2 having the specified IP address. In S4004, the VM management program 2923 ends the process when a normal end response is received from the storage subsystem 2.

<Priority Area Setting Process>

Figure 41:
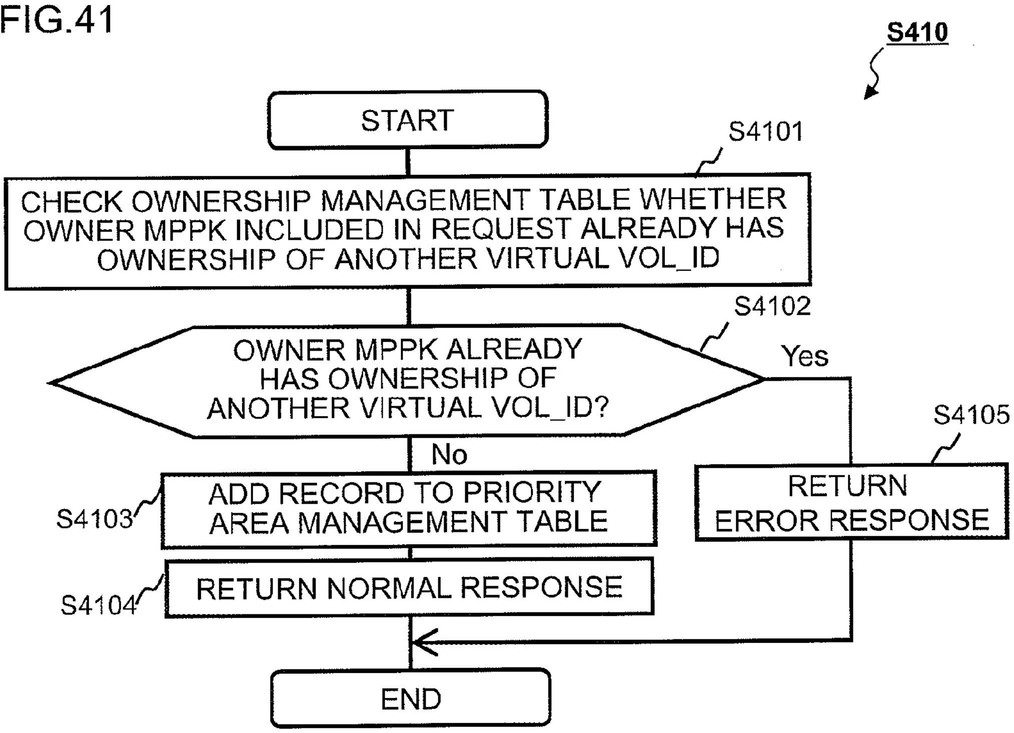
FIG. 41 is a flowchart illustrating a priority area setting process in a storage subsystem.

FIG. 41 is a flowchart illustrating a priority area setting process in the storage subsystem. A priority area setting process S410 is a process executed by the ownership control program 2501 of the storage subsystem 2 when the storage subsystem 2 receives a prioritized VM setting request from the management server 29. The subject of the process is described as the ownership control program 2501, but it can be the MP (such as the MP 201) in which the ownership control program 2501 operates.

In S4101, the ownership control program 2501 checks by referring to the ownership management table 280 whether the owner MPPK included in the request already has ownership of another virtual VOL_ID. In S4102, the ownership control program 2501 determines whether the owner MPPK already has ownership of another virtual VOL_ID. If it has the ownership of another virtual VOL_ID (Yes), the ownership control program 2501 executes S4105, and if not (No), it executes S4103.

In S4103, the ownership control program 2501 adds a record to the priority area management table 270. Then, in S4104, the ownership control program 2501 returns a normal end response to the management server 29. In S4105, the ownership control program 2501 returns an error response to the management server 29.

<Process for Assigning Priority Area Processing>

Figure 42:
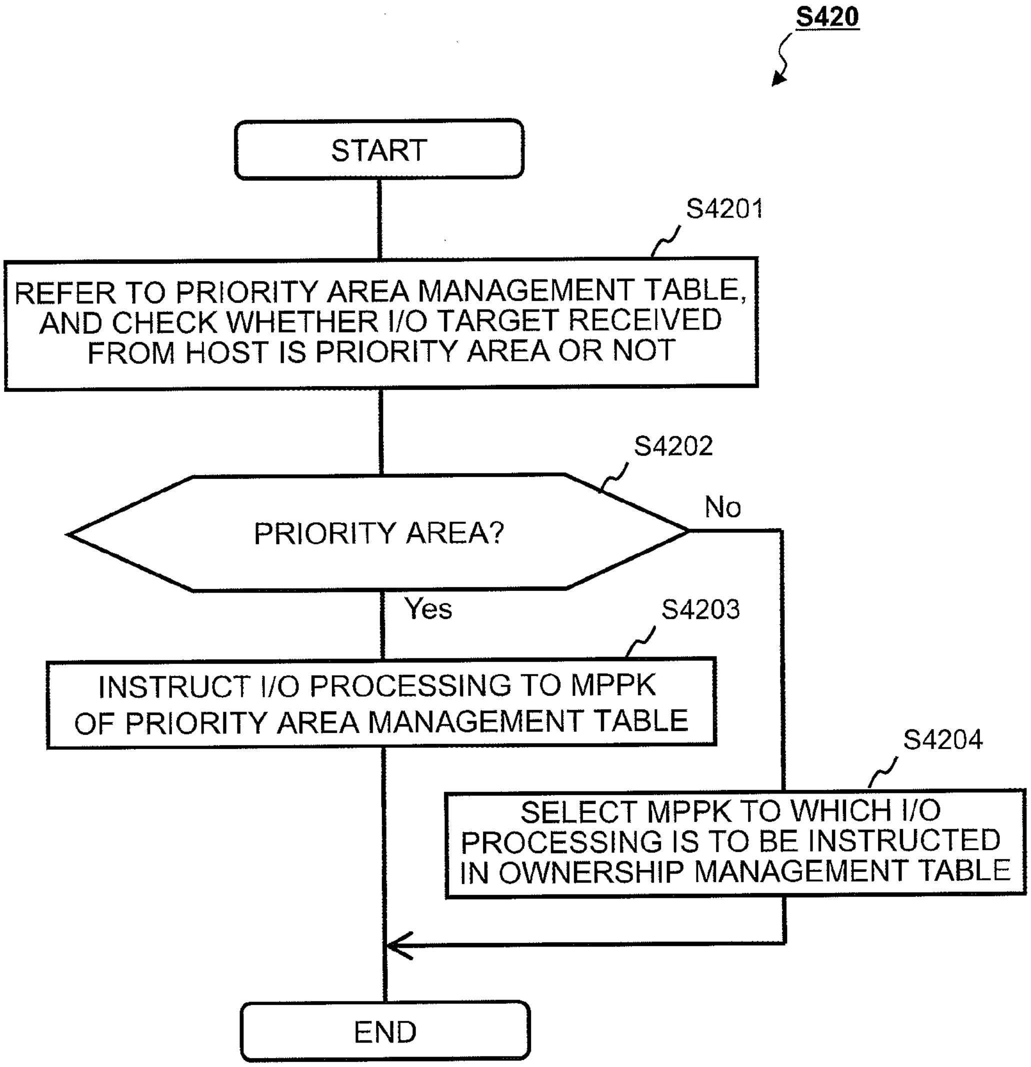
FIG. 42 is a flowchart illustrating a process for assigning a priority area of a CHA_PK (LR) in a storage subsystem.

FIG. 42 is a flowchart illustrating a process for assigning priority areas of the CHA_PK (LR) in the storage subsystem. The priority area assignment process S420 is started when the I/O request from the host 3 is received by the storage subsystem 2. The subject of the process is set as the LR 244 of the CHA_PK 24 of the storage subsystem 2, but it can be the aforementioned MP or other MPs.

In S4201, the LR 244 refers to the priority area management table 270 of the SM 261 and checks whether the access target of the I/O received from the host 3 is a priority area or not. Actually, the LR 244 determines whether the access target VOL_ID of the I/O received from the host 3 corresponds to the virtual VOL_ID 2701 of the record of the priority area management table 270 and that the access target address of the mentioned I/O is an address area within the start virtual page ID 2702 and the end virtual page ID 2703 of the record. In other words, if the ID corresponds and the address within the address area, the LR determines that the access target is a priority area.

In S4202, the LR 244 determines whether the target is a priority area or not. If the target is determined to be a priority area as a result of S4201 (Yes), the LR 244 executes S4203. If the target is not a priority area (No), that is, if the I/O targets a virtual VOL or address other than those specified in the priority area management table 270, the LR 244 executes S4204.

In S4203, the LR 244 instructs the MPPK having the number indicated in the owner MPPK 2704 in the priority area management table 270 to process the I/O. The MPPK having received the instruction orders the MP having the smallest amount of I/Os in progress to execute the process. In S4204, the LR 244 refers to the ownership management table 280 to select the MPPK to which the I/O processing is to be instructed, and instructs the selected MPPK to execute the I/O processing.

As described, even in a VM environment where multiple VMs share a single virtual volume, the processing of I/Os related to the storage area for a VM having a high priority can be executed by an MPPK that differs from the MPPK having ownership of the volume including that storage area. In addition, the processing of I/Os related to the storage area for a VM having a high priority can be processed by two or more MPPKs. Thus, the I/O processing of VMs having high priority can be executed with priority, and the response performance thereof can be improved.

The preferred embodiments 1 through 6 illustrates examples in which I/O processing is shared among MPPK units, but it is possible to share the I/O processing among multiple MPs within a single MPPK.

The present invention is not restricted to the above-illustrated preferred embodiments, and can include various modifications. The above-illustrated embodiments are described in detail to help understand the present invention, and the present invention is not restricted to a structure including all the components illustrated above. Further, a portion of the configuration of an embodiment can be replaced with the configuration of another embodiment, or the configuration of a certain embodiment can be added to the configuration of another embodiment. Moreover, a portion of the configuration of each embodiment can be added to, deleted from or replaced with other configurations.

A portion or whole of the above-illustrated configurations, functions, processing units, processing means and so on can be realized via hardware configuration such as by designing an integrated circuit. Further, the configurations and functions illustrated above can be realized via software by the processor interpreting and executing programs realizing the respective functions. The information such as the programs, tables and files for realizing the respective functions can be stored in a storage device such as a memory, a hard disk or an SSD (Solid State Drive), or in a memory media such as an IC card, an SD card or a DVD. Only the control lines and information lines considered necessary for description are illustrated in the drawings, and not necessarily all the control lines and information lines required for production are illustrated. In actual application, it can be considered that almost all the components are mutually coupled.

REFERENCE SIGNS LIST

2 Storage subsystem
3 Host computer
20-23 MPPK
24 CHA_PK
29 Management server
50 Ownership management table
61 JCB
70 MP search table
201 MP
202/222 LM
244 LR
220 Table for managing number of I/Os
**231*a*** Prioritized VM
**231*b*** VM
232 Storage area for VM
270 Priority area management table
280 Ownership management table
323 VM control program
330 VM management table
2601 Priority area management table
2602 Ownership management table
2923 VM management program

The invention claimed is:

1. A storage subsystem coupled to a host computer, comprising:

a communication interface unit for transmitting and receiving an I/O command and data to/from the host computer;

a storage device unit for allocating a storage area to a volume storing the data from the host computer;

at least two processor packages including multiple processors for controlling the storage device unit and the communication interface unit; and a shared memory for storing a control information including an ownership management information shared and accessed by the processors; wherein an I/O processing of the volume from the host computer is divided based on the ownership management information, and the processing is executed in a shared manner by two or more processor packages, wherein the ownership management information includes a volume identification information, a first processor package information having ownership of the volume, a division number of the volume, a boundary address indicating a division position, and a second processor package information in charge of the I/O processing of a divided area, wherein when the division number is 1, the first processor package executes I/O processing of the volume; and when the division number is 2 or more, the I/O processing is executed by:

a first processor package if an access start address of the I/O command and an address area computed based on a data transfer length is equal to or smaller than the boundary address, in other words, within a former half area;

a second processor package if the address is greater than the boundary address, in other words, a latter half area; and if the I/O processing is extended over the former half area and the latter half area of the boundary address, the first processor package divides the I/O processing by the boundary address, wherein the I/O of the divided former half area is executed by the first processor package, and the I/O of the divided latter half area is executed by the second processor package.

2. The storage subsystem according to claim 1, wherein if the division number is 2 and the address area extends over the former half area and the latter half area of the boundary address, the first processor package executes I/O processing of the address area.

3. The storage subsystem according to claim 1, wherein the communication interface unit includes a communication controller for controlling the communication with the host computer, and a memory for storing the ownership management information; and the communication controller transfers the I/O command to the first processor package or the second processor package based on a volume information of the I/O command and the ownership management information.

4. The storage subsystem according to claim 3, wherein if the division number of the ownership management information is 1, the communication controller transfers the I/O command to the first processor package, and the first processor package executes I/O processing of the volume;

if the division number is 2, the communication controller computes an address area subjected to I/O processing based on an access start address and a data transfer length of the I/O command;

in the former half area where the address area is equal to or smaller than the boundary address, the I/O command is transferred to the first processor package to have the I/O processing executed therein;

in the latter half area where the address area is greater than the boundary address, the I/O command is transferred to the second processor package to have the I/O processing executed therein; and if the address area extends over the former half area and the latter half area of the boundary address, the I/O processing is divided by the boundary address, and the divided I/O processing is respectively executed by a first processor package for the divided former half area and a second processor package for the divided latter half area.

5. The storage subsystem according to claim 1, wherein the volume includes multiple fixed length areas to which the storage areas are allocated, wherein regarding a number of I/Os for each fixed length area from the host computer occurring within a given period of time and a number of I/Os extending over fixed length areas, the I/O processing is divided into at least two areas at a dividing position where total numbers of I/Os of successive fixed length areas become even and a number of I/Os extending over different areas becomes small, wherein I/O processing of the divided areas is executed by different processor packages.

6. The storage subsystem according to claim 1, comprising multiple virtual computers operating in the host computer, and multiple virtual volumes allocating storage areas to the virtual computer, wherein I/O processing is performed by allocating a dedicated processor package in charge of I/O processing of the storage area allocated to the virtual computer set so as to process the I/O processing with priority.

7. A storage subsystem coupled to a host computer, comprising:

a communication interface unit for transmitting and receiving an I/O command and data to/from the host computer;

a storage device unit for allocating a storage area to a volume storing the data from the host computer;

at least two processor packages including multiple processors for controlling the storage device unit and the communication interface unit; and a shared memory for storing a control information including an ownership management information shared and accessed by the processors; wherein an I/O processing of the volume from the host computer is divided based on the ownership management information, and the divided I/O processing is executed by two or more processors within a processor package having ownership the ownership management information includes a volume identification information, a first processor information having ownership of the volume, a division number of the volume, a boundary address indicating a division position, and a second processor information in charge of the I/O processing of a divided area, wherein when the division number is 1, the first processor executes I/O processing of the volume; and when the division number is 2 or more, the I/O processing is executed by:

a first processor if an access start address of the I/O command and an address area computed based on a data transfer length is equal to or smaller than the boundary address, in other words, within a former half area;

a second processor if the address is greater than the boundary address, in other words, a latter half area; and if the I/O processing is extended over the former half area and the latter half area of the boundary address, the first processor divides the I/O processing by the boundary address, wherein the I/O of the divided former half area is executed by the first processor, and the I/O of the divided latter half area is executed by the second processor.

8. The storage subsystem according to claim 7, wherein if the division number is 2 and the address area extends over the former half area and the latter half area of the boundary address, the first processor executes I/O processing of the address area.

9. The storage subsystem according to claim 7, wherein the communication interface unit includes a communication controller for controlling the communication with the host computer, and a memory for storing the ownership management information; and the communication controller transfers the I/O command to the first processor or the second processor based on a volume information of the I/O command and the ownership management information.

10. The storage subsystem according to claim 9, wherein if the division number of the ownership management information is 1, the communication controller transfers the I/O command to the first processor, and the first processor executes I/O processing of the volume;

if the division number is 2, the communication controller computes an address area subjected to I/O processing based on an access start address and a data transfer length of the I/O command;

in the former half area where the address area is equal to or smaller than the boundary address, the I/O command is transferred to the first processor package to have the I/O processing executed therein;

in the latter half area where the address area is greater than the boundary address, the I/O command is transferred to the second processor package to have the I/O processing executed therein; and if the address area extends over the former half area and the latter half area of the boundary address, the I/O processing is divided by the boundary address, and the divided I/O processing is respectively executed by a first processor for the divided former half area and a second processor for the divided latter half area.

11. The storage subsystem according to claim 7, wherein the volume includes multiple fixed length areas where the storage areas are allocated, wherein regarding a number of I/Os for each fixed length area from the host computer occurring within a given period of time and a number of I/Os extending over fixed length areas, the I/O processing is divided into at least two areas at a dividing position where total numbers of I/Os of successive fixed length areas become even and a number of I/Os extending over different areas becomes small, wherein I/O processing of the divided areas is executed by different processors.

12. The storage subsystem according to claim 7, comprising multiple virtual computers operating in the host computer, and multiple virtual volumes allocating storage areas to the virtual computer, wherein I/O processing is performed by allocating a dedicated processor package in charge of I/O processing of the storage area allocated to the virtual computer set so as to process the I/O processing with priority.

* * * * *